United States Patent [19]

Hayashi et al.

[11] Patent Number: 4,979,435
[45] Date of Patent: Dec. 25, 1990

[54] APPARATUS FOR AUTOMATICALLY PROCESSING, COOKING AND SELLING NOODLES

[75] Inventors: Atsuo Hayashi, Ohizumimachi; Mitsuo Shimada, Ohta, both of Japan

[73] Assignee: Sanyo Electric Co., Ltd., Moriguchi, Japan

[21] Appl. No.: 514,064

[22] Filed: Apr. 24, 1990

[30] Foreign Application Priority Data

Apr. 26, 1989 [JP] Japan .................................. 1-108051
Aug. 7, 1989 [JP] Japan .................................. 1-202896

[51] Int. Cl.$^5$ .................................................. A47J 27/10
[52] U.S. Cl. ........................................ 99/334; 99/353; 99/355; 99/357; 99/404; 99/407; 99/416; 99/470; 221/150 HC
[58] Field of Search ................. 99/335, 334, 336, 337, 99/330, 331, 353, 355, 357, 342, 403, 404, 407, 416, 484, 516, 470; 426/451, 523, 557; 425/190, 191, 376 R, 464; 221/150 A, 150 HC

[56] References Cited

U.S. PATENT DOCUMENTS

| | | | |
|---|---|---|---|
| 4,030,632 | 6/1977 | Harashima | 99/357 |
| 4,360,332 | 11/1982 | Cyin | 425/376 R |
| 4,438,683 | 3/1984 | Bartfield | 221/150 A |
| 4,619,189 | 10/1986 | Kou . | |
| 4,685,386 | 8/1987 | Bezon | 99/404 |
| 4,732,080 | 3/1988 | Vita | 99/407 |
| 4,803,916 | 2/1989 | Tacconi | 99/355 |
| 4,803,917 | 2/1989 | Barbieri | 99/404 |
| 4,813,572 | 3/1989 | Schmidt | 221/150 HC |
| 4,821,633 | 4/1989 | Ripatonda | 99/357 |
| 4,869,160 | 9/1989 | Pratolongo | 99/330 |

FOREIGN PATENT DOCUMENTS 0049714 3/1984 Japan ................................. 99/407

Primary Examiner—Timothy F. Simone
Attorney, Agent, or Firm—Armstrong, Nikaido, Marmelstein, Kubovcik & Murray

[57] ABSTRACT

The present invention relates to an apparatus for automatically processing, cooking and selling noodles, which is applied to so-called boiled and cooked noodles, such as "wheat vermicelli", "buckwheats" and "Chinese-style vermicelli". The apparatus comprises a reception means for receiving a coin or a fixed medium such as a card from a customer to issue an order reception card; a noodle manufacturing means for forming a noodle substrate into noodle lines in response to the operation of the reception means to deliver it as a unit of one meal; a noodle boiling means for receiving the noodle lines as one meal delivered from the noodle manufacturing means into a first water permeable basket which is moved within a boiling hot water tank to boil it up; a boiled noodle rinsing means for receiving the noodle boiled up by the noodle boiling means into a second water permeable basket which is moved within a processing tank to rinse it; a boiled noodle casting means for casting, dishing-out and receiving the cooked boiled noodles within the second water permeable basket subjected to rinsing by the boiled noodle rinsing means into a vessel; a vessel distribution means for distributing the vessel to a dishout set position of the boiled noodle casting means; a cooked boiled noodle reception means for receiving the cooked boiled noodle vessel distributed by the vessel distribution means and dished out by the boiled noodle casting means; and a delivery means for delivering the cooked boiled noodle vessel received in the cooked boiled noddle reception means in response to a customer's reception request resulting from an insertion of the order reception card.

7 Claims, 22 Drawing Sheets

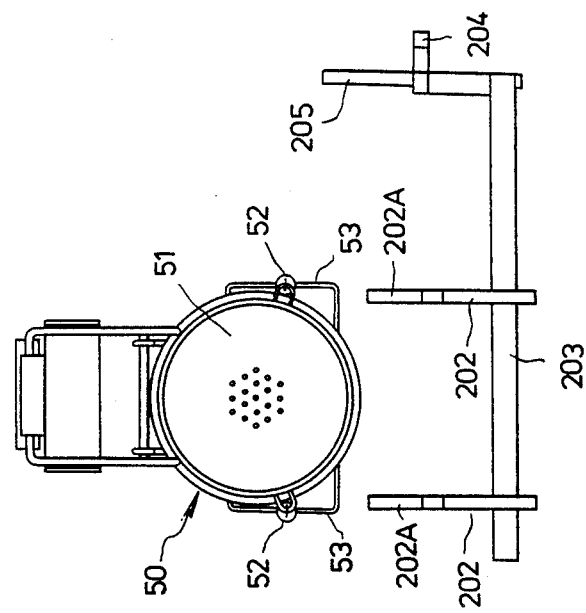
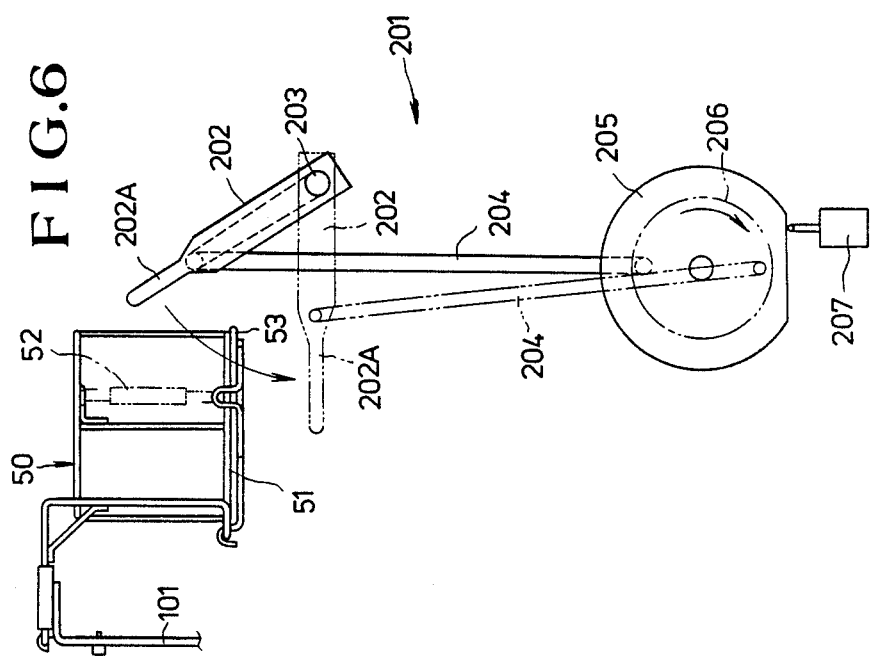

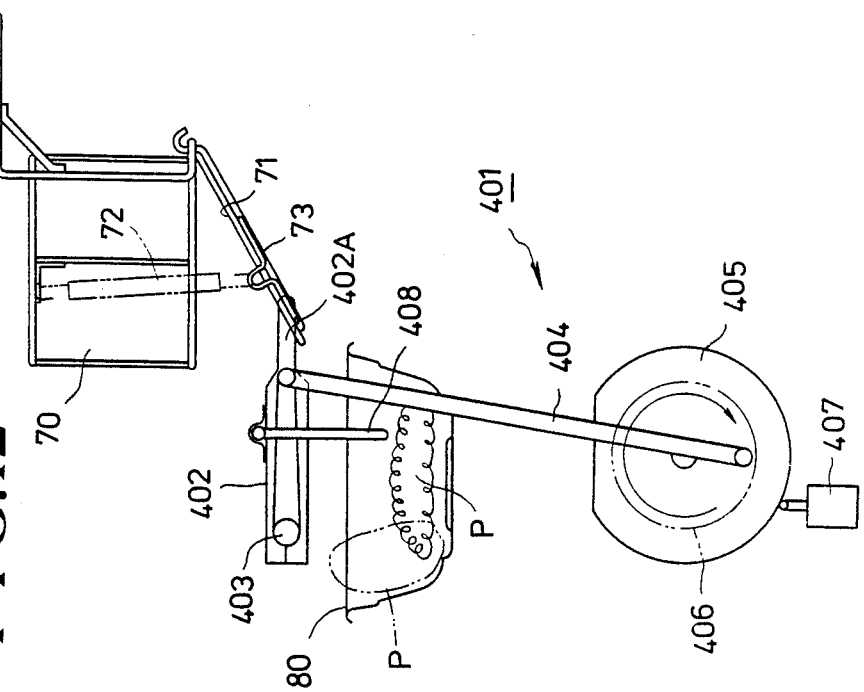
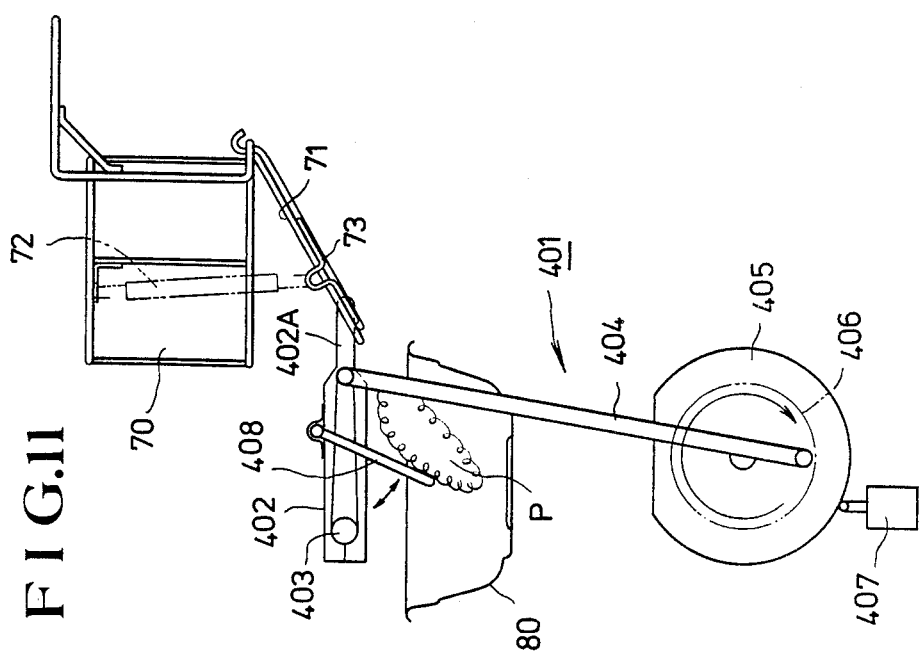

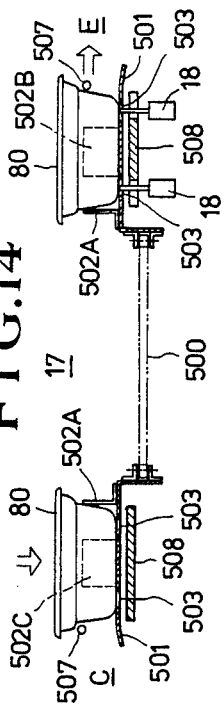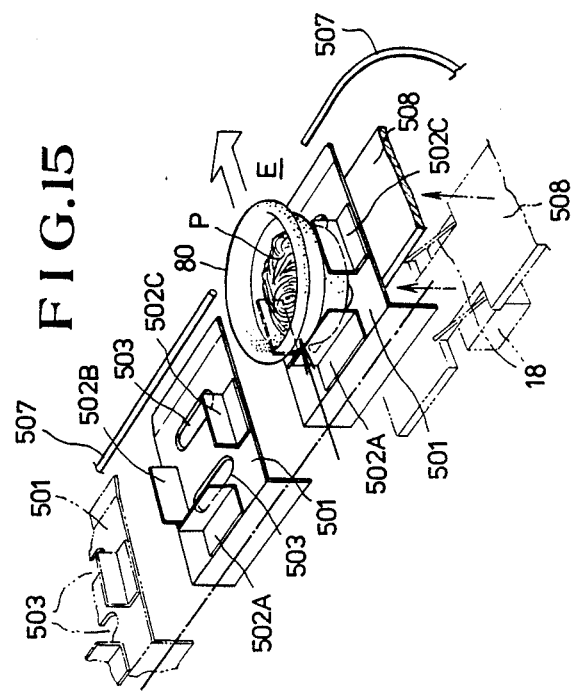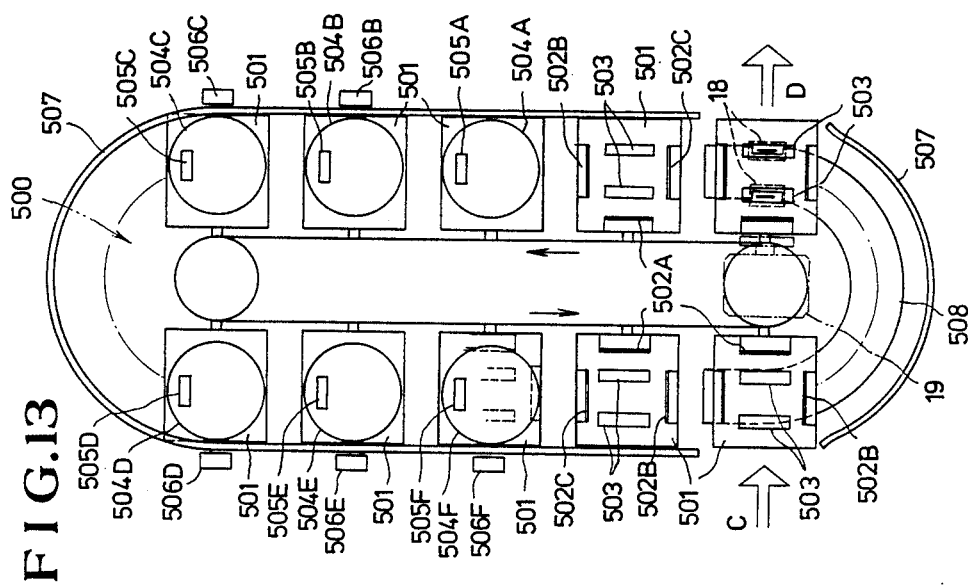

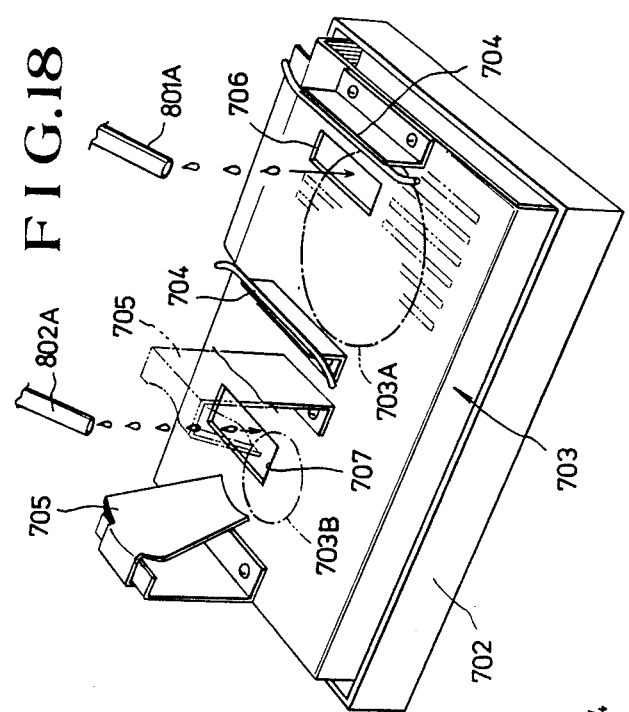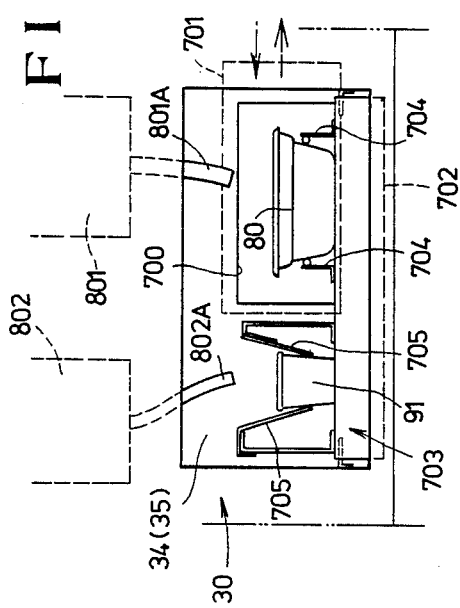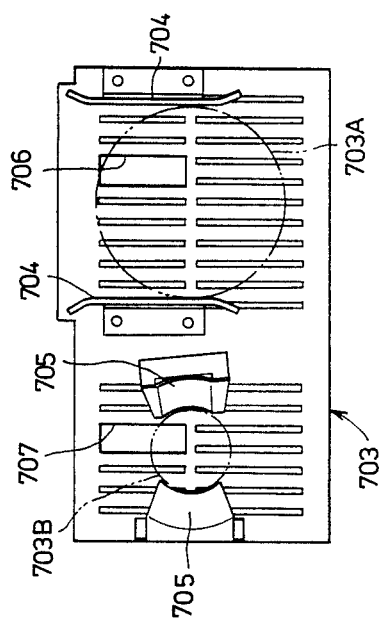

IN PREPARATION
PLEASE WAIT FOR A WHILE

FUKIAGE-TEI

PLEASE TRY DELICIOUS
WHEAT VERMICELLI
AND BUCKWHEATS.

FOR ORDERING
WHEAT VERMICELLI
OR BUCKWHEATS,
PLEASE BUY A
FOOD TICKET.

WELCOME !

WELCOME !
PLEASE PUSH A PROPER BUTTON.

THANK YOU.
PLEASE KEEP YOUR FOOD
TICKET AND WAIT FOR A WHILE.
PLEASE RECEIVE THE GOODS
AT A COUNTER.

RUSH.
PLEASE WAIT FOR A WHILE.

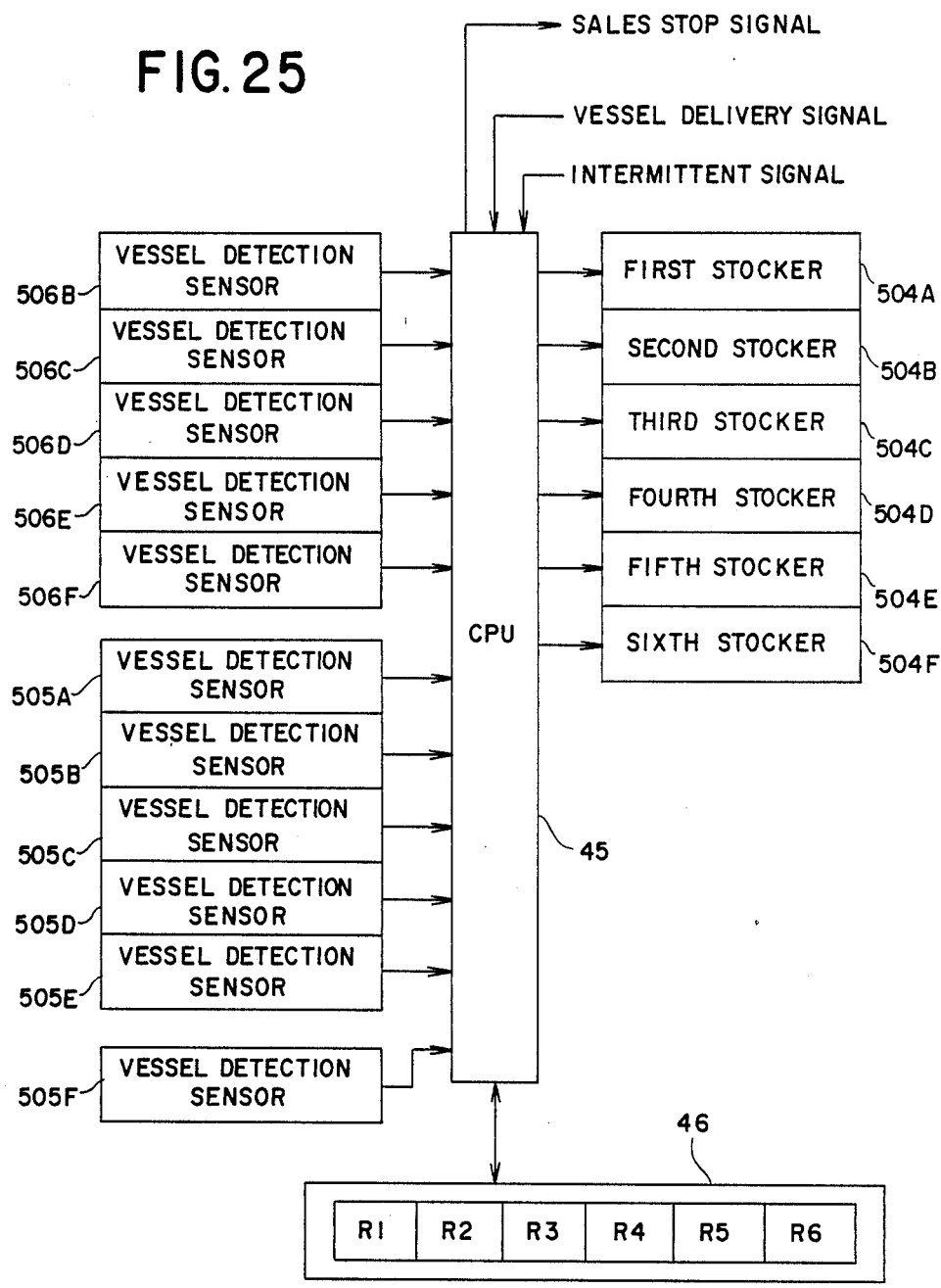

APPARATUS FOR AUTOMATICALLY PROCESSING, COOKING AND SELLING NOODLES

BACKGROUND OF THE INVENTION

1. Field of the Invention

The present invention releates to an apparatus for automatically processing, cooking and selling noodles, which is applied to so-called boiled and cooked noolndes, for example, such as "wheat vermicelli or noodles", "buckwbeats" or "Chinese-style vermicelli".

2. Description of the Prior Art

As the apparatus for processing and cooking noodles of this kind, apparatus having the structure as disclosed, for example, in Japanese Patent Application Laid-Open Publication No. 60-172264 (U.S. Pat. No. 4,619,189) has been heretofore known.

In the conventional apparatus for processing and cooking noodles as described above, wheat flour and kneading water are mixed to produce a needle substrate, the noodle substrate is formed into noodle lines which are delivered as a unit of one meal, the unit of one meal of the noodle lines is boiled, rinsed, etc. and thereafter the noodles are put into a vessel.

However, presently, in the above-described conventional apparatus for processing and cooking noodles, all operations such as reception of order menu and receiving an order from a customer, starting of manufacturing, boiling and rinsing noodles in the apparatus, and delivery of vessels with processed and cooked noodles put therein and setting have been manually made. A selling system for collectively and automatically carrying out all the steps has not yet been developed.

Therefore, even if automation of manufacturing, boiling, rinsing and the like is effected, a considerable number of persons are required, thus posing problems in that not only opening time is restricted by opening time of the shop but also the shop cannot respond to the demands of customers at midnight or in the early morning.

SUMMARY OF THE INVENTION

It is an object of the present invention to provide an apparatus for automatically processing, cooking and selling noodles which can collectively and fully automatically performing all operations from the receiving an order of noodles to manufacturing, boiling, rinsing and delivery of noodles without requiring hands of the shop.

For achieving the above-described object, the present invention provides an apparatus comprising a reception means into which is inserted by a customer currency or medium such as a card and issuing an order-receiving card by selecting noodles to be sold, a noodle manufacturing means operated in respose to the selection of the noodles by said reception means to form a noodle substrate into noodle lines and delivering a unit of one meal, a noodle boiling means for receiving the noodle lines of one meal delivered from said noodle manufacturing means into a first hydrobasket which moves within a boiling water tank to boil the noodles, a boiled noodle rinsing means for receiving the noodles boiled by said noodle boiling means into a second hydrobasket which moves within a processing tank to rinse and process the noodles, a boiled noodle casting means for casting the cooked and boiled noodles within said second hydrobasket rinsed and processed by said boiled noodle rinsing means into a vessel to dish-out and receive the noodle, a vessel distributing means for distributing the vessel to a dish-out set position of said boiled noodle casting means, a cooked boiled noodle receiving means for receiving the cooked boiled noodle vessel dished out by said boiled noodle casting means distributed by said vessel distributing means, and a delivery means for delivering the cooked boiled noodle vessel received in said cooked boiled noodle receiving means in response to a customer's request of reception caused by the casting of said order receiving card, said vessel distributing means comprising a plurality of distribution tables which are intermittently moved around by means of a vessel carrier mechanism, plural (N) units of vessel supplying devices arranged on said distribution tables to deliver and place the vessels one by one, first vessel detecting sensors each provided within each of said vessel supplying devices to detect the presence or absence of a received vessel therein, and second vessel detecting sensors each detecting the presence or absence of a vessel delivered and placed on each of the distribution tables from each of said vessel supplying devices, each of said vessel supplying devices capable of delivering vessels preferentially for those up to the (N−1)th device in order from the farthest position from the set position and capable of using as a stand-by the N-th vessel supplying device at the nearest position from the set position.

According to the present invention, when the currency or medium such as a card is inserted into the reception means by a customer to select the noodles to be sold, the order-receiving card is issued and the automatic processing and cooking apparatus composed of the noodle manufacturing means, the noodle boiling means and the boiled noodle rinsing means is actuated whereby the desired boiled noodles are processed and cooked, the cooked boiled noodles are dished out in the vessel supplied from the vessel distributing means and received into the cooked noodle receving means, and the vessel with the cooked boiled noodles put therein is delivered from the delivery means in response to the customer's request of reception caused by the casting of the order-receiving card. Therefore, the operation from the reception of the order of the noodles to the manufacturing, boiling processing, rinsing and delivery can be collectively fully automatically carried out.

Moreover, the vessel distributing means can place the vessels delivered one by one from the plural (N) units of vessel supplying devices on the plurality of distribution tables which are moved by the carrier mechanism and supplied to the set position, and each of the vessel supplying devices can deliver vessels preferentially for those up to the (N−1)th device from the farthest position from the set position and can use as a stand-by the N-th vessel supplying device at the nearest position from the set position. Therefore, even if the vessel supplying devices up to the N-th become empty or become failure, vessels can be supplied positively by the N-th vessel supplying device.

BRIEF DESCRIPTION OF THE DRAWINGS

The present invention will be described with reference to one embodiment shown in the drawings, in which

FIG. 6 is a schematic side view of a first boiled noodle casing device;

FIG. 7 is a schematic plan view of the first boiled noodle casing device;

FIGS. 11 and 12 are respectively schematic side views showing the state where the cooked boiled noodles are cast into a vessel by the second boiled noodle casting device;

FIG. 13 is a schematic plan view showing a vessel distributing device;

FIG. 14 is a sectional view showing essential parts of the vessel distributing device;

FIG. 15 is a perspective view showing essential parts of the vessel distributing device;

FIG. 16 is a front view showing essential parts at a delivery opening of a delivery device;

FIG. 17 is a plan view of a vessel receiving plate in the delivery device;

FIG. 18 is a perspective view showing a unified state of the vessel receiving plate and a drain pan in the delivery device;

FIG. 25 is a block diagrame showing the control structure of the vessel distributing device.

DETAILED DESCRIPTION OF THE INVENTION

Figure 1:
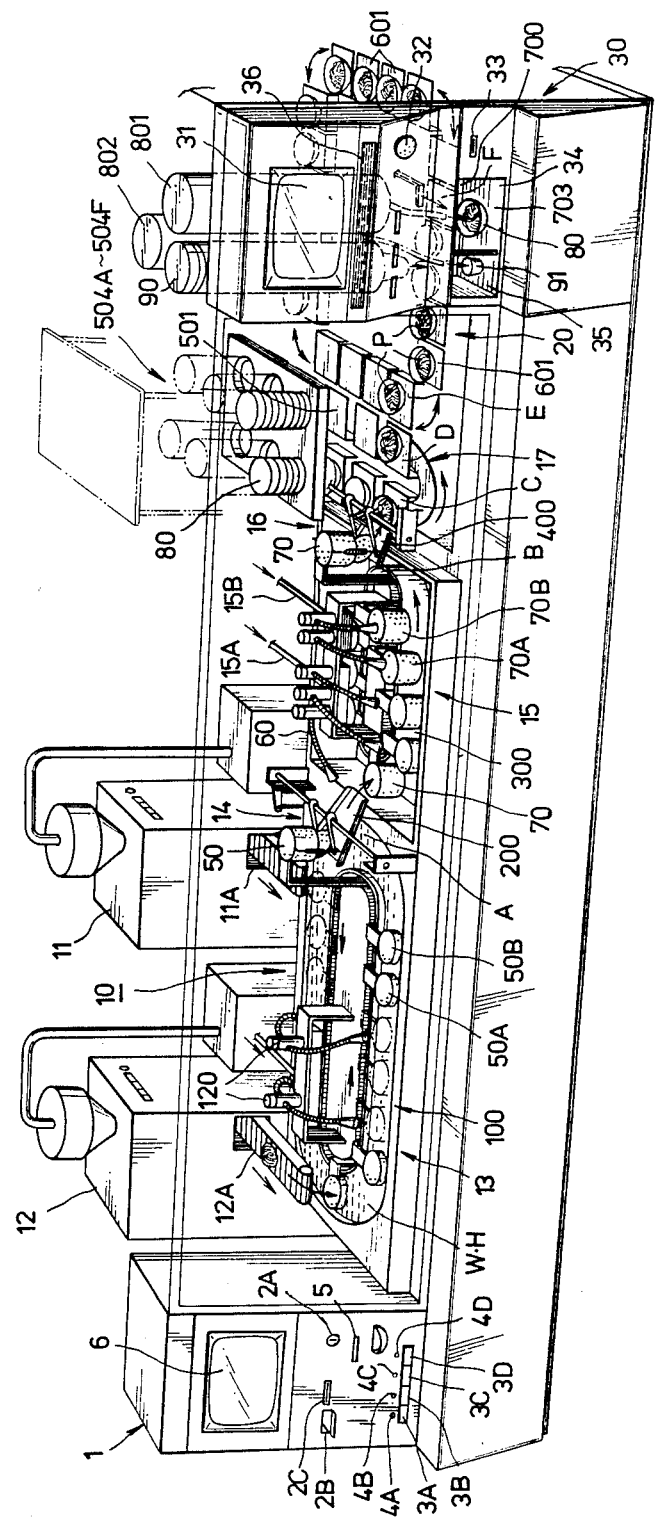
FIG. 1 is an overall external view showing one embodiment of an apparatus for automatically processing, cooking and selling noodles according to the present invention.
Figure 2:
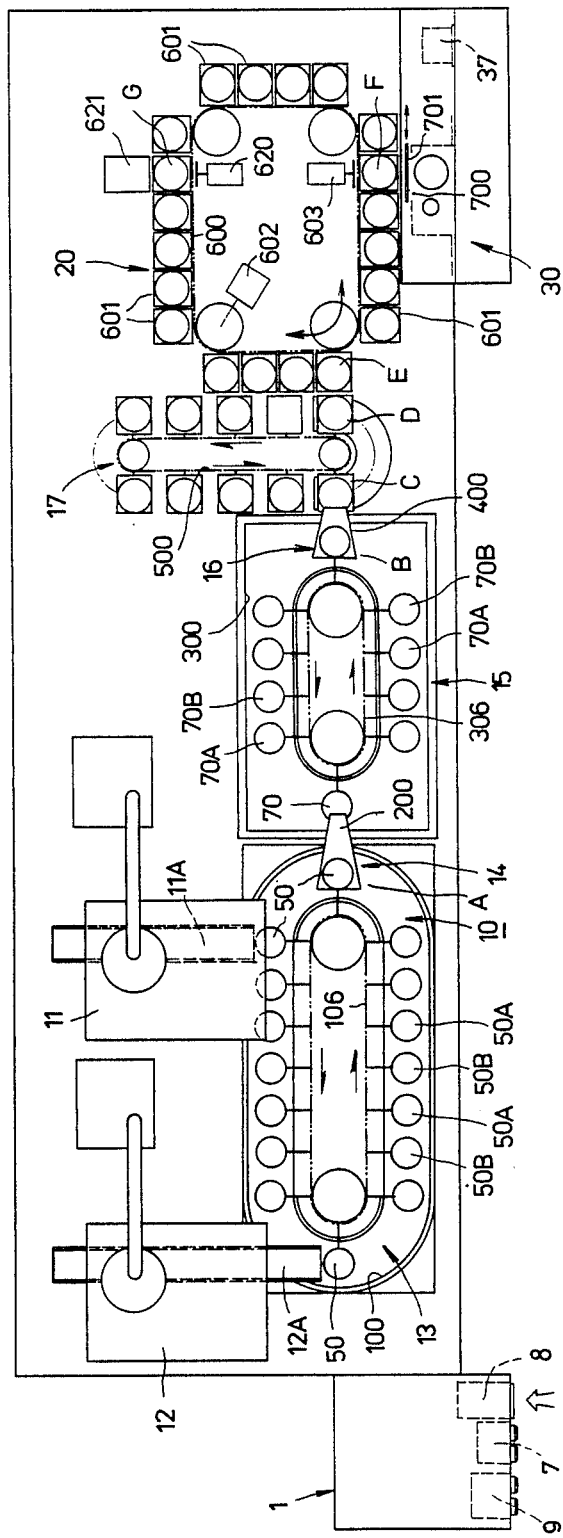
FIG. 2 is a schematic plan view of the same.
Figure 3:
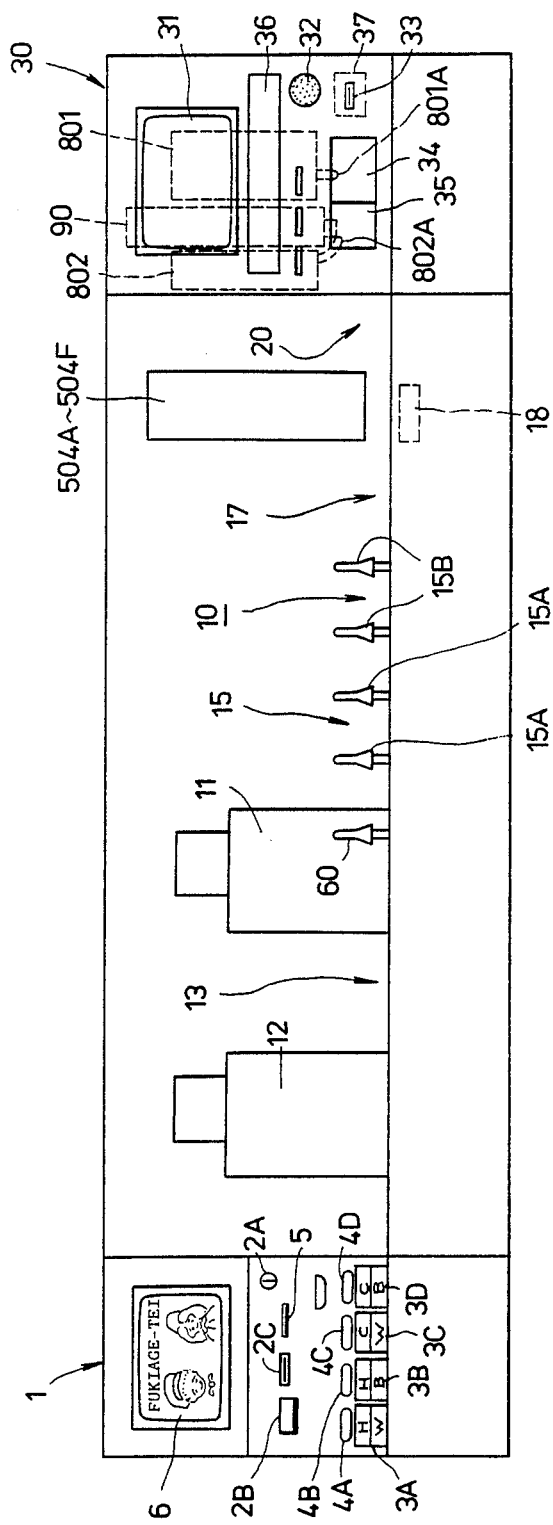
FIG. 3 is a schematic front view of the same.

As shown in FIGS. 1 to 3, reference numeral 1 designates a reception device as a reception means which issues an order receiving card (which is made into a plate-like or sheet-like form of synthetic resin or paper, whose shape is generally rectangular but shapes such as a circle may also may be used. In short, a medium will suffice for receiving selling noodles selected by the selective operation) when currency or fixed medium (not shown) such as a card is inserted by a customer to initiate the selective operation of selling noodles. On the front surface of the reception device are arranged a coin slot 2A, a currency slot 2B, a card slot 2C for a prepaid card, etc., selective switches 3A, 3B, 3C and 3D of an order menu (In the present embodiment, as the kind of noodles to be sold, there are four kinds of noodles, i.e., "wheat vermicelli in soup" and "buckwheat in soup" which are hot noodles, and "wheat vermicelli on a screen-bottomed vessel" and "buckwheat on a screen-bottomed vessel" which are cold noodles), sellout displays 4A, 4B, 4C and 4d corresponding to the selective switches, respectively, a card sales opening 5 issuing an order receiving card of the order menu selected by the selective switch, a picure display 6 composed of CRT which displays, on the picture screen, services and guides for operation of order menu caused by the casting of currency and card, etc.

The reception device 1 encases therein a coin processing device 7 for sorting coins cast through the coin slot 2A to output a currency signal, a currency and card processing device 8 for discriminating currency or card cast through the currency slot 2B or the card slot 2C to output a currency signal, and a card issuing device 9 for writing and storing kinds and data of the order menu selected by the respective selective switches 3A, 3B, 3C and 3D, issued date and time, order-receiving numbers, etc. on an order-receiving card and printing the contents thereof on the card to feed it to the card sales opening 5.

In the figures, reference numeral 10 designates an appratus for automatically processing and cooking noodles operated on the basis of the selective operation of the selling noodles by the reception device 1.

The automatic processing and cooking apparatus 10 is composed of a first noodle manuacturing machine 11 for manufacturing "wheat vermicelli", a second noodle manufacturing machine 12 for manufacturing "buckwheats", a noodle boiling device 13 for boiling the raw noodles (noodle substrate) manufactured by these first and second noodle manufacturing machines 11 and 12, a boiled noodle rinsing device 15 wherein the noodles boiled by the noodle boiling device 13 are cast through a first boiled noodle casting device 14 and the thus cast boiled noodles are selectively rinsed by a cold water rinsing device 15a or a hot water rinsing device 15B, a second boiled noodle casting device 16 for casting into a vessel the boiled noodles rinsed and dedewed by the rinsing device 15, and a vessel distributing device 17 for distributing the vessel to a fixed position corresponding to the boiled noodle casting device 16.

The first and second noodle manufacturing machines 11 and 12 are designed so that in accordance with a signal from the reception device 1, a grain flour (wheat flour or buckwheat flour) and kneading water are mixed within a cylinder by blades which rotate at high speeds to produce a noodle substrate in the form of powdered fish, the noodle substrate is rolled while being formed into a lump by a roller device and then formed into noodle lines by a roll type cutter, the product being delivered as a unit of one meal through carrier devices 11A and 12A.

Figure 4:
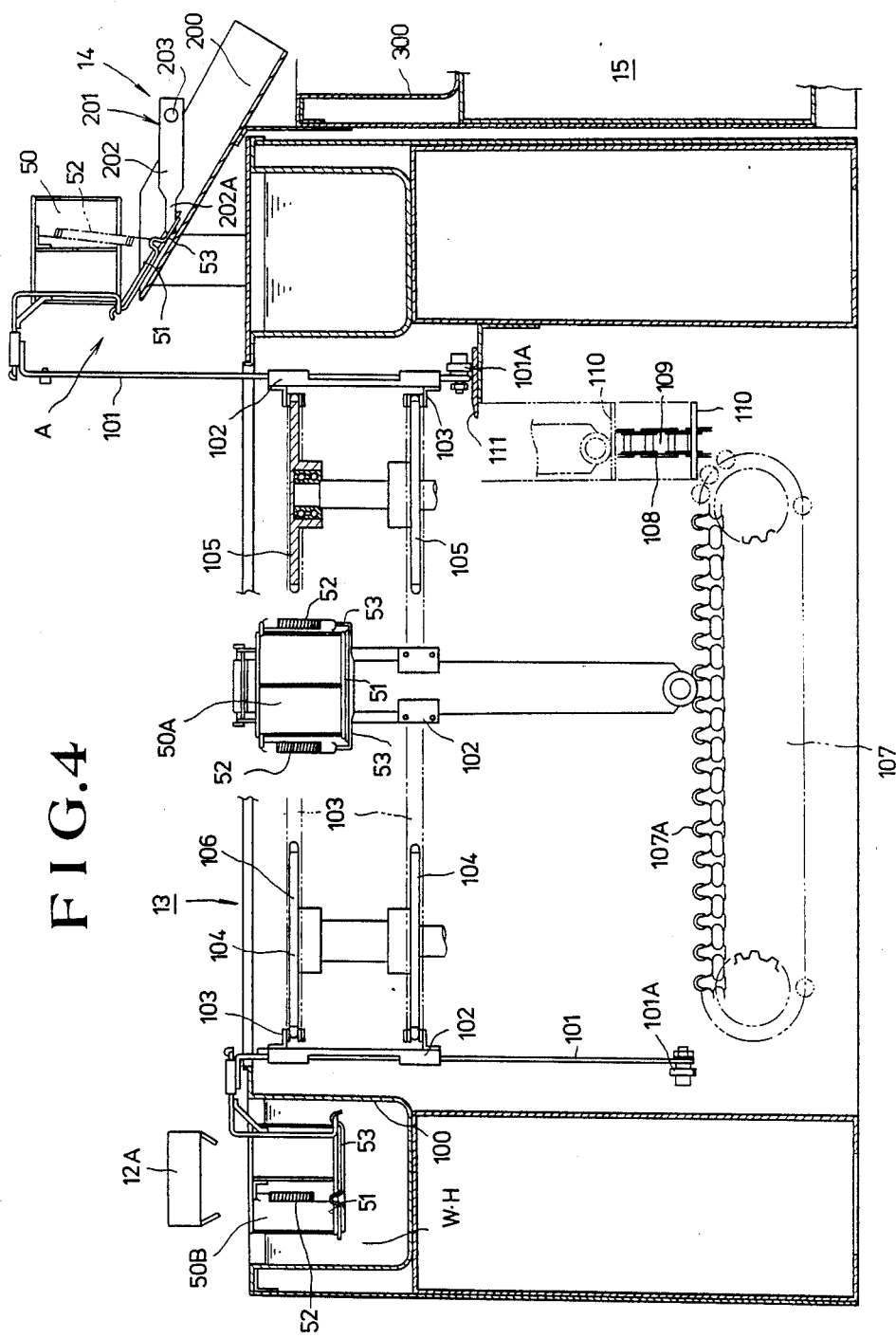
FIG. 4 is an enlarged sectional view showing essential parts of a noodle boiling apparatus.

The noodle boiling device 13 comprises, as shown in FIG. 4, a track-like boiling hot water tank 100 for heating and boiling hot water W.H poured by a heater not shown, a plurality (16 in the illustrated embodiment) of first noodle receiving baskets 50 (a basket 50A for receiving "wheat vermicelli" and a basket 50B for receiving "buckwheats") formed from netting cages in the form of a bottomed cylinder and having a water permeability which are alternately arranged in spaced relation within the track of the boiling hot water tank 10, a pair of upper and lower chain belts 103, 103 for supporting movably up and down at two points these baskets 100 through supporting rods 101 and retainers 102, a drive device 106, driven by an electric motor not shown, comprising a drive pulley 104 and a driven pulley 105 for intermittently moving the chain belts 103, 103 in a horizontal direction by one basket portion, a vibration applying device 107 formed from a chain body 107A with a roller with which contacts a lower end 101A with a roller of the supporting rod 101 for supporting movably up and down each of the baskets 50 and rotated by an electric motor not shown to apply a vibration to each of the moving baskets 50, and and a first basket elevating device 108 for moving up and down each of said baskets 50 at a position corresponding to the first boiled noodle casing device 14, said first basket elevating device 108 being designed so that the lower end 101a with a roller of the supporting rod 101 for supporting the basket is placed on a baseplate 110 moved up and down by a vertically moving chain 109, said supporting rod 101 being moved upward by the elevating operation of the baseplate 110, and the lower end 101A with a roller of the supporting rod 101 is rolled on a guide plate 111 formed on the side of the first boiled noodle casting device 14 within the apparatus by the intermittent movement of the drive device 106, whereby the basket 50 in its up state may be carried toward the first boiled noodle casting device 14.

More specifically, in the noodle boiling device 13, the noodle lines of one meal of the "wheat vermicelli" or "buckwheats" fabricated by the first or second noodle manufacturing machines 11 and 12 are delivered through the carrier device 11A or 12A and cast into the receiving basket 50 (basket 50A for receiving "wheat vermicelli" or basket 50B for receiving "buckwheats") under the dipped state while maintaining the down state in the hot water W.H within the boiling hot water tank 100, the drive device 106 is driven correspondingly to the boiling time and at the same time, the receiving basket 50 is vibrated by the operation of the vibration applying device 107 and intermittently moved around while untangling the noodle lines within the basket 50 so as to boil the noodles by the boiling hot water W.H within the boilding hot water tank 100.

In this case, in order that the boiled-up positions A of the "wheat vermicelli" and "buckwheats" assume the same position, the first noodle manufacturing machine 11 for manufacturing the "wheat vermicelli" which requires a long time to be boiled is arranged at a position away from the boiled-up position A whereas the second noodle manufacturing machine 12 for manufacturing "buckwheats" which requires a short time to be boiled is arranged at a position near the boiled-up position A so that when the noodles are at the boiled-up position A, they assume the boiled-up state. Further, for example, as shown in FIG. 2, when the basket 50A for receiving "wheat vermicelli" assumes a position corresponding to the first noodle manufacturing machine 11 for manufacturing "wheat vermicelli", the basket 50B for receiving "buckwheats" assumes a position corresponding to the second noodle manufacturing machine 12 for manufacturing "buckwheats", so that the basket 50A for receiving "wheat vermicelli" uses, as the boiled-up position A, the 16th position from the position corresponding to the first noodle manufacturing machine 11 whereas the basket 50B for receiving "buckwheats" uses, as the boiled-up position A, the 9th position from the position corresponding to the second noodle manufacturing machine 12.

That is, the basket 50A for receiving "wheat vermicelli" is intermittently moved 15 times by the drive device 106 to thereby reach the boiled-up position, and the basket 50B for receiving "buckwheats" is intermittently moved 8 times by the drive device 106 to thereby reach the boiled-up position A.

Under this state, when the basket 50 in which noodle lines are received moves close to the boiled-up position A, the first basket elevating device 108 actuates to upwardly move the basket 50 through the supporting rod 101 so that the basket 50 is raised from the interior of the boiling hot water tank 100 and carried toward the first boiled noodle casting device 14.

Figure 5:
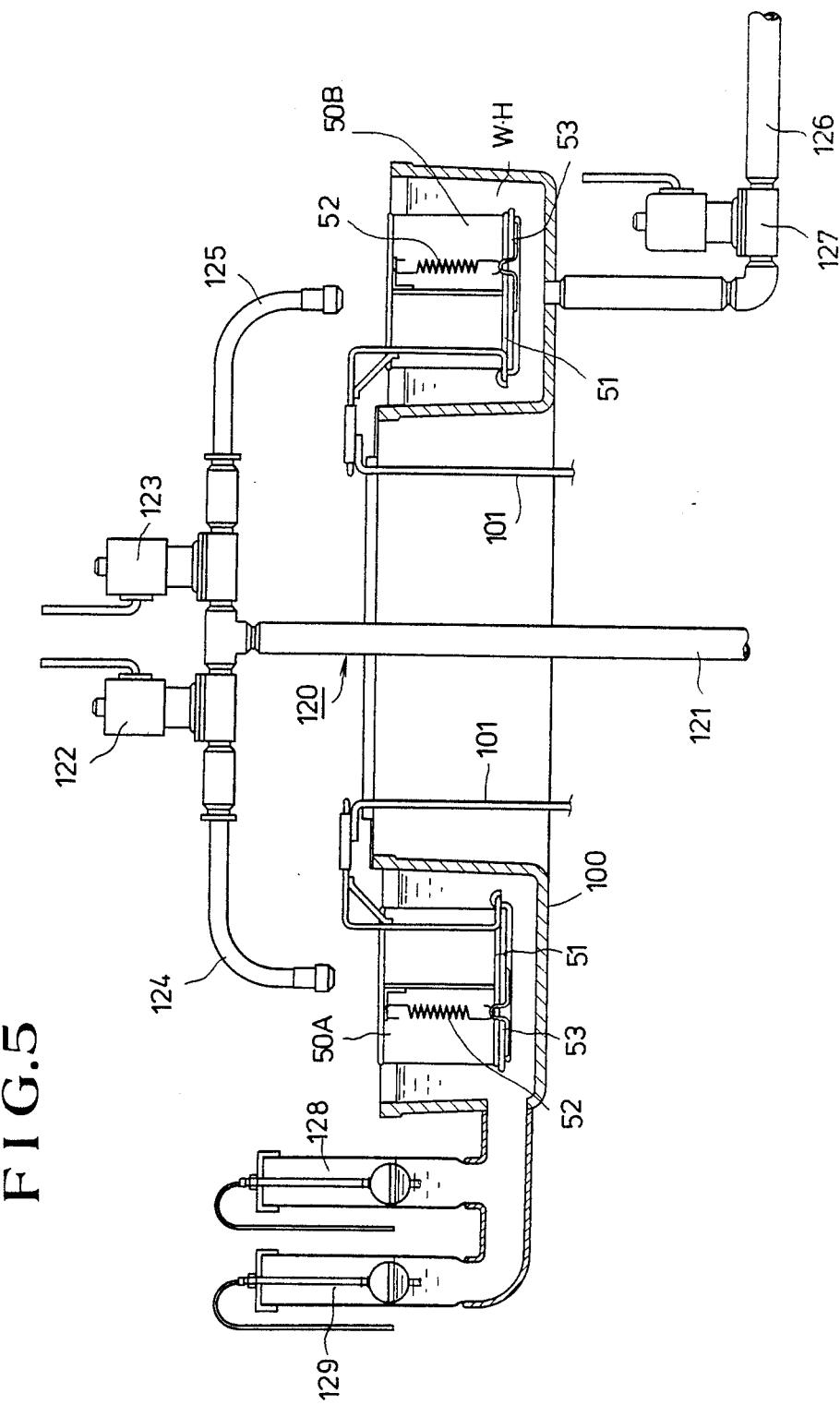
FIG. 5 is an enlarged sectional view showing essential parts of a hot water supply mechanism in the noodle boiling apparatus.

Boiling hot water is supplied by a hot water supply device 120 into the boiling hot water tank 100 as shown in FIG. 5.

In the hot water supply device 120, injection nozzles 124, provided above the boiling hot water tank 100 while being branched from a hot water pipe 121 through first and second electromagnetic valves 122 and 123, respectively, are arranged at downstreams of the carrier devices 11A and 12A to which are delivered the noodle lines from the first and second noodle manufacturing machines 11 and 12, and the injection nozzles 124 and 125 are made to correspond to the baskets 50 which are intermittently moved around within the boiling hot water tank 100.

That is, in the hot water supply device 120, boiling hot water is injected toward the noodle lines received within the basket 50 having a limited size for a fixed period of time by the control of the first and second electromagnetic valves 122 and 123 whereby the noodle lines within the basket 50 are stirred so that they swim within the boiling hot water tank 100 to enhance the boiled-up efficiency. In addition, even in the case where the boiling hot water within the boiling hot water tank 10 is absorbed by the noodle lines or the noodle lines are not boiled, the hot water may be replenished according to the quantity of reduction whenever it is vaporized and reduced, and on the other hand, there can be obtained a purifying function so as to prevent a delay of the boiled-up speed resulting from the weakening of the permeation force of the boiling hot water to the noodle lines due to the eluation of starch and salt contained in the noodle lines, for example.

Reference numeral 126 designates a hot water discharge pipe provided in the bottom of the boiling hot water tank 100 through a third electromagnetic valve 127; 128 a first level detection switch for detecting an upper limit level of the boiling hot water in the boiling hot water tank 100; and 129 a second level detection switch for detecting a lower limit level of the boiling hot water in the boiling hot water tank 100.

The switches 128 and 129 are so designed that a position of a float may be detected by a proximity switch. When the boiling hot water within the boiling hot water tank 100 exceeds the upper limit level due to the stirring and injection of the hot water to the noodle lines by the hot water supply device 120 or the replenishment of the hot water resulting from the vaporization or the like, such a state is detected by the first level detection switch 128 whereby the first or second electromagnetic valves 122, 123 is closed to stop the supply of hot water to prevent an overflow of the boiling hot water and the third electromagnetic valve 127 is opened for a fixed period of time so that the boiling hot water within the boiling hot water tank 100 is discharged through the hot water discharge pipe 128 and at the same time, precipitates such as "wheat vermicelli scum" and "buckwheat scum" stayed in the inner bottom of the boiling hot water tank 100 are discharged to purify the boiling hot water.

The second level detection switch 129 is controlled so as to detect the state when the boiling hot water within the boiling hot water tank 100 lowers in the lower limit level to cause the first and second electromagnetic valves 122 and 123 of the hot water supply device 120 to open whereby the boiling hot water may be supplied into the boiling hot water 100.

While during the discharge of the boiling hot water within the boiling hot water tank 100, as the timing for closing the third electromagnetic valve 127, the first level detection switch 128 which is actuated when the boiling hot water within the boiling hot water tank 100 exceeds the upper limit level has been used, it is to be noted that the second level detection switch 129 which is actuated when the boiling hot water within the boiling hot water tank 100 lowers than the lower limit level may be used. In addition, if the quantity of replenishment of the boiling hot water by the hot water supply device 120 is increased more than the quantity of reduction, it is possible to further enhance the purifying effect of the boiling hot water within the boiling hot water tank 100.

The boiled noodles P within the basket 50 reached the boiled-up position A after the noodle lines have been boiled up by the noodle boiling device 13 are cast into a basket 70 for receiving boiled noodles on the side of the boiled noodle rinsing device 15 which will be described later by the first boiled noodle casting device 14.

The first boiled noodle casting device 14 is composed of a first chute 200 having a U-shape in section inclined on the side of the boiled noodle rinsing device 15 installed at a position at which the bottom of the basket 50 corresponds at the boiled-up position A, and a first basket opening and closing mechanism 201 adapted to open and close a bottom plate 51 provided to be opened and closed at the bottom of the basket 50.

As shown in FIGS. 6 and 7, the first basket opening and closing mechanism 201 comprises a pair of first left and right pivotal arms 202, 202 which engages a frame 53 which urges the bottom plate 51 of the basket 50 in a direction of closing it by means of a pair of left and right springs 52, 52 to support the bottom plate 51 so that the latter may be opened and closed to depress the frame 53 against the bias force of the springs 52, 52, a pivotal shaft 203 for pivotably supporting the first pivotal arms 202, 202, a rotational plate 205 for vertically reciprocating and rotating the arms 202, 202 through a connecting arm 204, a drive motor 206 for rotating and driving the rotational plate 205, and a detection switch 207 for detecting a full rotational operation of the rotational plate 205, whereby as shown in FIG. 4, the frame 53 of the basket 50 is depressed by extreme ends 202A, 202A of the first pivotal arms 202, 202 to thereby open downwardly the bottom plate 51 of the basket 50, and thereby the boiled noodles P received in the basket 50 are dropped onto the first chute 200 and cast into the basket 70 for receiving boiled noodles on the side of the boiled noodle rinsing device 15.

Reference numeral 60 designates a shower device installed above the first chute 200. The shower device 60 jets rinsing water when the boiled noodles are cast onto the first chute 200 to rinse the noodles so as to prevent the "wheat vermicelli scum" and "buckwheat scum" from being remained on the first chute 200. Further, the rinsing water causes a slip of the boiled noodle to improve so that the boiled noodles may be easily cast toward the boiled noodle rinsing device 15.

The bottom plate 51 of the basket 50 opened by the first boiled noodle casting device 14 is springly closed and returned by the force of springs 52, 52 supporting tbe frame 53 after the pivotal arms 202, 202 have been opened by the drive of the drive motor 206 after the boiled noodles have been cast.

Figure 8:
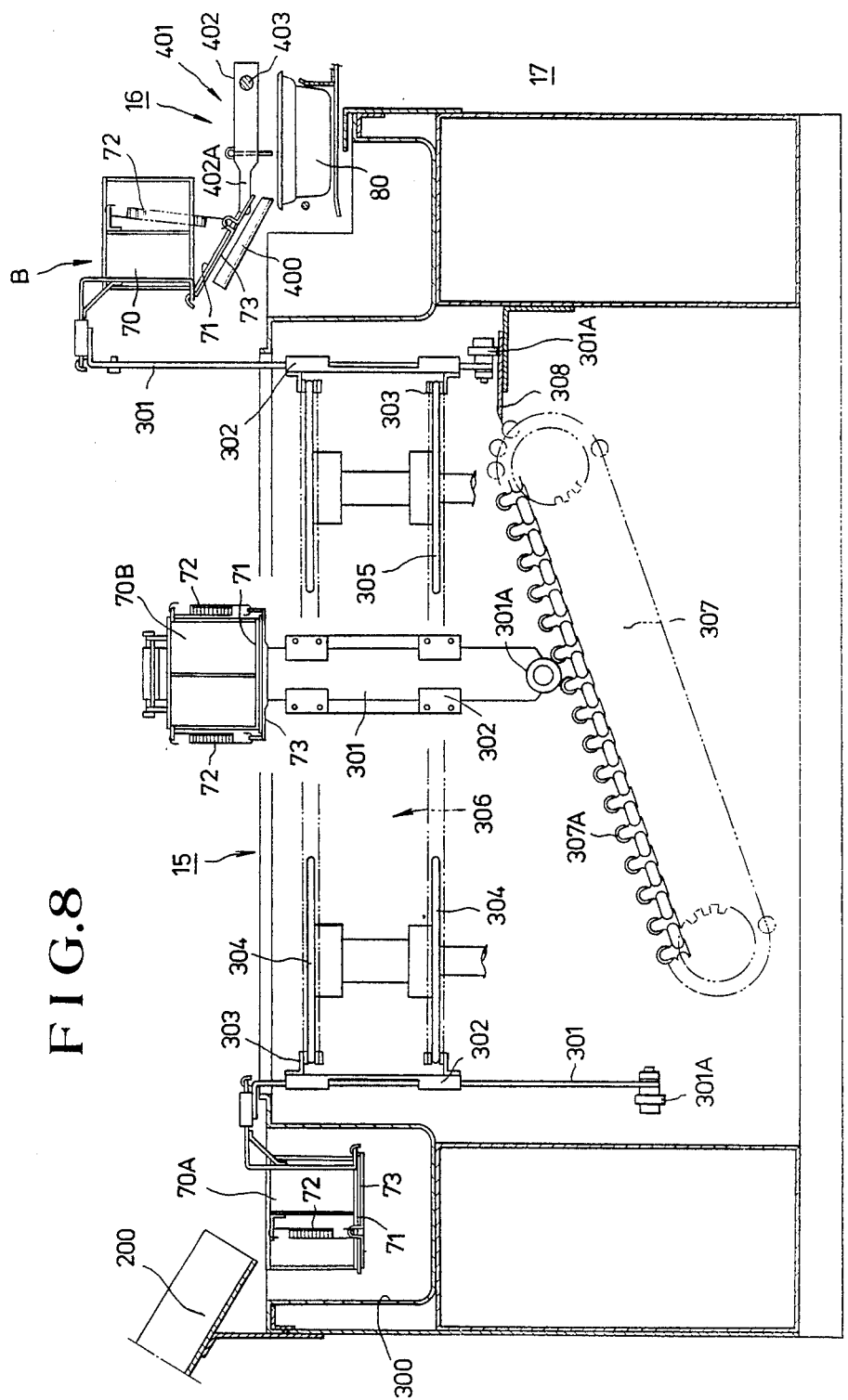
FIG. 8 is an enlarged sectional view showing essential parts of a boiled noodle rinsing device.

The boiled noodle rinsing device 15 comprises, as shown in FIG. 8, similar to the noodle boiling device 13, a track-like processing tank 300, a plurality (10 in the illustrated embodiment) of second baskets for receiving noodles 70 (a basket for receiving wheat vermicelli 70A and a basket for receiving buckwheats 70B) formed from netting cages in the form of a bottomed cylinder and having a water permeability which are alternately arranged in spaced relation within the track of the processing tank 300 and moved around in one direction, a pair of upper and lower chain belts 303, 303 for supporting movably up and down the respective baskets 70 at two points through a supporting rod 301 and a retainer 302, a drive device 306 driven by an electric motor not shown comprising a drive pulley 304 and a driven pulley 305 for intermittently moving both the chain belts 303, 303 in a horizontal direction by one portion of a basket, and a vibration applying device 307 comprising a chain body 307A with a roller with which contacts a lower end 301A with a roller of the supporting rod 31 vertically movably supporting each of the baskets 70 to apply a vibration to each of the baskets 70 being moved by the rotative drive by the electric motor not shown, whereby the vibration applying device 307 is inclined so as to serve as a second basket elevating device for elevating each of the baskets 70 to a position corresponding to the second boiled noodle casting device 16, and a lower end 301A with a roller of the supporting rod 301 vertically movably supporting the basket 70 is rolled on a guide plate 308 formed on the side of the second boiled noodle casting device 16 within the apparatus by intermittent movement by the drive device 30 so that the basket 70 in its up state may be carried toward the second boiled noodle casting device 16.

That is, the boiled noodle rinsing device 15 is operatively connected with the noodle boiling device 13, and when the boiled noodles are cast into the second basket for receiving noodles 70 (the basket for receiving wheat vermicelli 70A or the basket for receiving buckwheats 70B) through the first boiled noodle casting device 14 from the noodle boiling device 13, the rinsing device 15 is intermittently moved by the drive of the drive device 306 so that the boiled noodles within the basket 70 is rinsed while being cooled by cooling water by a cooling water rinsing device 15A installed at a position corresponding to the basket for receiving wheat vermicelli 70A or the basket for receiving buckwheats 70B. When after the rinsing, the boiled noodles selected as hot noodles by the reception device 1 is correspondingly positioned, the boiled noodles are subjected to hot water processing by a hot water rinsing device 15B installed at a position corresponding to the basket for receiving wheat vermicelli 70A and the basket for receiving buckwheats 70B to heat the boiled noodles. When the boiled noodles selected as cold noodles by the reception device 1 is correspondingly positioned, the boiled noodles are not subjected to hot water processing by the hot water rinsing device 15B but the noodles are dedewed while vibrating the basket 70 by the operation of the vibration applying and elevating device 307, after which it is moved upward to the processing termination position B on the side of the second boiled noodle casting device 16.

The cooling water rinsing device 15A preferably employs rinsing by cooling water from the water supply and drainage at about 10° C. or cooling water cooled to about 10° C. by a cooler. The hot water rinsing device 15B suitably employs processing by hot water at about 90° C.

In this case, when for example, the basket for receiving wheat vermericelli 50A is positioned at the boiledup position A of the first boiled noodle casting device 14, that is, upstream of the first chute 200, the basket for receiving wheat vermericelli 70A is correspondingly positioned downstream of the first chute 200, and conversely, when the basket for receiving buckwheats 50B is positioned upstream of the first chute 200, the basket for receiving buckwheats 70B is correspondingly positioned downstream of the first chute 200.

The drive device 306 is moved to the sixth position from the boiled-up position, that is, the drive device 306 is intermittently moved five times, whereby the basket 70 correspondingly positioned at the boiled-up position A is moved to the processing termination position B. The cooling water rinsing device 15A jets cooling water when the basket for receiving wheat vermicelli 70A or the basket for receiving buckwheats 70B with the boiled noodles P received therein corresponds thereto to rinse the "wheat vermicelli" or "buckwheats" with cooling water. The hot water rinsing device 15B is controlled so as to jet hot water only when the basket for receiving wheat vermicelli 70A or the basket for receiving buckwheats 70B with the boiled noodles P to be heated for which the reception device 1 has an order corresponds thereto.

When the basket for receiving the boiled noodles 70 subjected to rinsing processing by the boiled noodle rinsing device 15 in the above-described manner arrives at the processing termination position B, the boiled noodles P within the basket 70 are cast into the vessel 80 distributed from the vessel distributing device 17 which will be discribed later by the second boiled noodle casting device 16.

The second boiled noodle casting device 16 comprises, similarly to the first boiled noodle casting device 14 shown in FIGS. 4, 6 and 7, a second chute 400 having a U-shape in section inclined on the side of the vessel distributing device 17 installed at a position to which corresponds the bottom of the basket 70 at the processing termination position B, and a second basket opening and closing mechanism 401 for opening and closing a bottom plate 71 provided to be opened and closed at the bottom of the basket 70.

Figure 10:
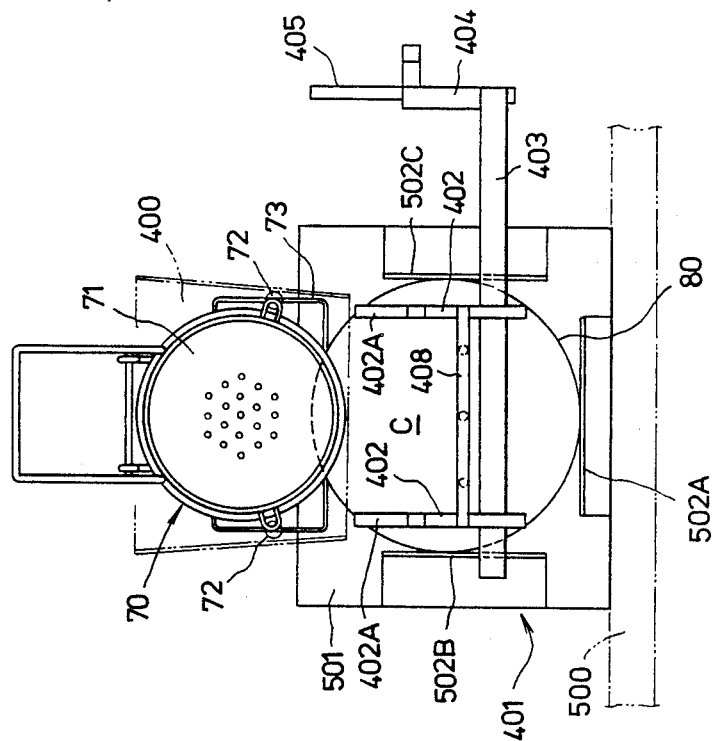
FIG. 10 is a schematic plan view of a second boiled noodle casting device.
Figure 9:
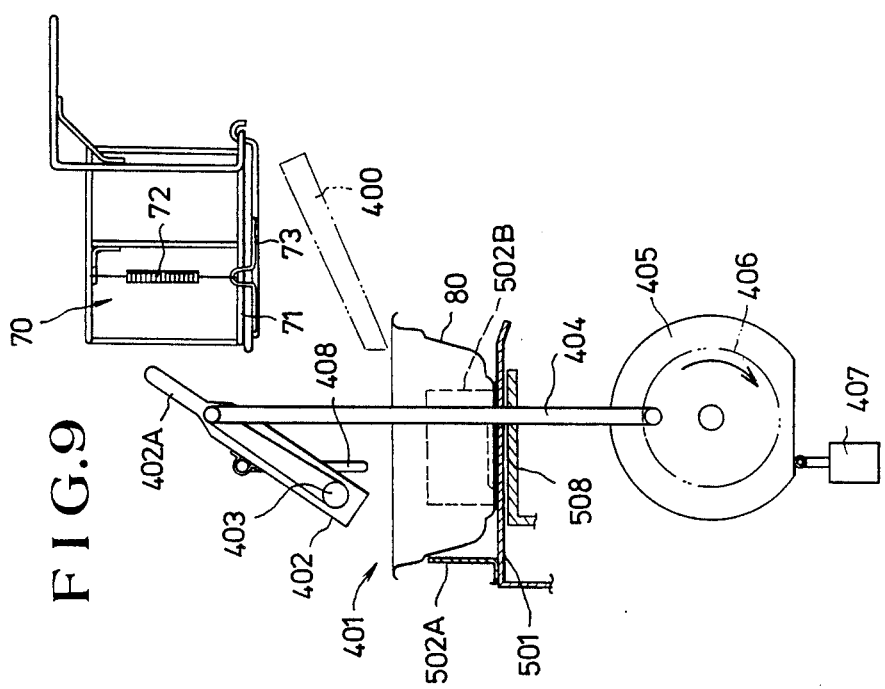
FIG. 9 is a schematic side view of a second boiled noodle casting device.

The second basket opening and closing mechanism 401 comprises, as shown in FIGS. 9 and 10, a pair of second left and right pivotal arms 402, 402, which engages a frame 73 which urges the bottom plate 71 of the basket 70 in a direction of closing it by means of a pair of left and right springs 72, 72 to support the bottom plate 71 so that the latter may be opened and closed to depress the frame 73 aginst the bias force of the springs 72, 72, a pivotal shaft 403 for pivotably supporting the second pivotal arms 402, 402, a rotational palte 405 for vertically reciprocating and rotating the arms 402, 402 through a connecting arm 404, a drive motor 406 for rotating and driving the rotational plate 405, a detection switch 407 for detecting a full rotational operation of the rotational plate 405, and a suppression member 408 supported for oscillation between the pivotal arms 402 and 402, whereby as shown in FIG. 8, the frame 73 of the basket 70 is depressed by extreme ends 402A, 402A of the second pivotal arms 402, 402 to thereby open downwardly the bottom plate 71 of the basket 70, and thereby the boiled noodles P received in the basket 70 are dropped onto the second chute 400 and cast into the vessel 80 distributed from the vessel distributing device 17 and dished out.

The bottom plate 71 of the basket 70 opened by the second boiled noodle casting device 16 is springly closed and returned by the bias force of the springs 72, 72 supporting the frame 73 after the pivotal arms 402, 40Z are opened by the drive of the drive motor 406 after the boiled noodles have been cast.

The suppression member 408 supported for oscillation between the pivotal arms 402 and 402 has a function of a baffle plate for causing the boiled noodles P dropped from the interior of the basket 70 to be contacted therewith when the noodles slip on the second chute 400 and are cast into the vessel 80 to define force thereof, thereby to control positioning of a casting position to prevent the boiled noodles P from being one-sided and dished out at one-side corner within the vessel 80 as indicated by the dash-dotted controur lines in FIG. 12.

In the vessel distributing device 17, as shown in FIGS. 13 to 15, plural units (10 units in the illustrated embodiment) of vessel placing distribution tables 501... formed from thin metal plates such as sheet metal are provided individually independently in fixed spaced relation on a track-like vessel carrier mechanism 500 formed from a chain belt which horizontally moves in one direction, support plates 502A, 502B and 502C for releasing the delivery direction of the vessel 80 to a cooked receiving device 20 on each of the distribution tables 501, whereby lateral deviation of the vessel 80 being moved is prevented by the support plates 502A, 502B and 502C, positioning accuracy of the vessel corresponding to the processing termination position B to the set position C is improved, and a pair of through-holes 503, 503 to which weight detecting devices 18, 18 which will be described later face from the underside are formed at the vessel placing position.

Reference numerals 504A to 504F designate six vessel supply devices (stockers) arranged correspondingly in order directed at the distribution tables 501... at downstream with the distribution table 501 positioned at the eighth position upstream from the set position C being the first. In each of the stockers 504A to 504F, a number of vessels (for example, 50 meals) are stocked within cylindrical receivers, and the vessels are delivered onto the distribution table 501 one by one by a delivery mechanism not shown in order from the first stocker 504A located away from the set position C the sixth stocker 504F located near the set position C being a stand-by stocker which is not normally used.

Reference numerals 505A to 505F designate first vessel detection sensors for derecting the presence or absence of the lowest level vessel stocked within each of the stocker 504A to 504F, and reference numerals 506B to 506F designate second vessel detection sensors for detecting the presence or absence of a vessel delivered and placed on the distribution table 501 from each of the stockers 504A to 504F.

The vessel distributing device 17 is operatively connected to the respective drive devices 106 and 306 of the aforementioned noodle boiling device 13 and the boiled noodle rinsing device 15, whereby the vessels 80 are delivered in order preferentially from the first stocker 504A corresponding to the eighth distribution table 501 upstream from the set position C, according to the presence or absence of the noodle lines within the basket 50 being boiled up in the noodle boiling device 13 positioned at the third upstream from the boiled-up position A, to place the vessels on the distribution table 501 corresponding thereto, and by seven times of intermittent movement thereof, the vessel 80 delivered and placed on the distribution table 501 from the first stocker 504A may be set to the set position C.

The vessel 80 in which the cooked boiled noodles are cast by the second boiled noodle casting device 16 at the set position C is sent to a feed-out position D by one intermittent movement of the vessel distribution device 17 and placed on a receiving table 601 of the cooked receiving device 20 through a transfer device 19.

At the feed-out position D, a pair of weight detecting devices 18, 18 as weight detection means are provided. The pair of weight detecting devices 18, 18 are located to be projected upwardly from a pair of through-holes 503, 503 formed at the vessel placing position on the distribution table 501 to weigh at the feed-out position D the weight of the cooked boiled noodles (including the vessel) within the vessel 80 placed on the distribution table 501 and compare it with a preset weight to examine whether or not the weighed weight is in the allowable range, that is, whether or not a fixed quantity of the cooked boiled noodles are received into the vessel. If the weighed result is within the fixed allowable range, the vessel 80 with the cooked boiled noodles put therein is transferred to the cooled receiving device 20 by the operation of the transfer device 19. If the noodles are defective outside the fixed allowable range, the automatic processing and cooking device 10 is again driven for re-processing and cooking. In this case, the defective product is transferred to the cooked receiving device 20 by the operation of the transfer device 19 after issuance of instructions for re-processing and cooking to the automatic processing and cooking device 10, and is then disposed outside the cooked receiving device 20 by a vessel extrusion and disposal device 620 which will be described later.

If the weighed result by the weight detecting devices 18, 18 is outside the allowable range continuously a fixed times, instructions are issued to the reception device 1 so as to stop receiving an order of kinds of boiled noodles outside the allowable range to stop sales and inform so a manager whereas the thereafter processing and cooking of those kinds of boiled noodles will be stopped.

Reference numeral 507 designates a guide frame disposed in the outer periphery of the track-like vessel carrier mechanism 500. The guide frame 507 is provided to prevent the vessel 80 placed on the distribution table 501 from being dislocated outside during the movement or from being disengaged, those corresponding to the set position C of the vessel and the feed-out position D being omitted. Reference numeral 508 designates a support table disposed in a distribution course from the set position C of the vessel to the feed-out position D to back-up from the underside the distribution table 501 on which the boiled noodle vessel 80 is placed so as to withstand the weight of the boiled noodle vessel 80.

In the cooked receiving device 20 as the receiving means for the cooked noodle vessel, the cooked boiled noodle vessels 80 transferred from the vessel distributing device 17 through the transfer device 19 are placed and received at a reception position E corresponding to the feed-out position D on plural units (20 units in the illustrated embodiment) of receiving tables 601 . . . individually independently provided on a horizontally reciprocatable track-like carrier mechanism 600. The cooked boiled noodle vessels 80 placed and received on these receiving tables 601 . . . are selectively delivered to a delivery opening 700 of the delivery device 30 in accordance with a reception requesting operation by a customer at the delivery device 30 which will be described later.

That is, in the cooked receiving device 20, the carrier mechanism 600 is driven by a carrier motor 602 to transfer the receiving table 601 on which the vessel 60 with the fixed cooked boiled noodles put therein is placed to the delivery position F and is delivered toward the delivery device 30 which will be described later by means of a vessel extruding device 603.

The defective product transferred toward the cooked receiving device 20 by the operation of the transfer device 19 after issuance of instructions for re-processing and cooking to the autoamtic processing and cooking device 10 is carried to a disposal position G by the selective drive of the carrier motor 602 and disposed outside the cooked receiving device 20 through a disposal chute 621 by the operation of a vessel extruding and disposal device 620 provided corresponding to the disposal position G. In case where the cooked boiled noodle vessel 80 remains placed on the receiving table 601, because the customer fails to receive it or the like, and if it stays within the cooked receiving device 20 for a fixed period of time, then the carrier motor 602 is driven to carry the vessel to the disposal position G where the vessel is disposed and processed through the disposal chute 621 by the operation of the vessel extruding and disposal device 620.

In the delivery device 30 as the delivery means in compliance with a customer's receiving request, as shown in FIGS. 16 to 18, a shutter 701 operatively connected to the vessel extruding device 603 is provided open- and closeably in a delivery opening 700 opened to the delivery position F, the shutter 701 being opened when the cooked boiled noodle vessel 80 is extruded and delivered by the vessel extruding device 603 so that the cooked boiled noodle vessel 80 may be delivered and placed on a perforated plate-like vessel receiving plate 703 installed on a drain pan laid on the front surface of the delivery opening 700 and the shutter may be closed by the return operation of the vessel extruding device 603 after the delivery of the vessel.

A first vessel place portion 703A on which the cooked boiled noodle vessel 80 is placed through a first holder 704 and a second vessel place portion 703B on which a soup vessel 91 delivered from a soup-vessel delivery device 90 for cold noodles is placed through a second holder 705 are positioned adjacent to each other on the vessel receiving plate 703, and supply nozzles 801A and 802A of a hot soup supply unit 801 and a cold soup supply unit 802 are positioned corresponding to the first and second vessel place portions 703A and 703B, respectively. Reference numerals 706 and 707 designate soup receiving holes formed in the first and second vessel place portions 703A and 703B positioned corresponding to the supply nozzles 801A and 802A, respectively. These soup receiving holes 706 and 707 are provided so that when the hot soup or cold soup from the hot soup supply unit 801 or the cold soup supply unit 802 is supplied through the supply nozzle 801A or 302A into the cooked boiled noodle vessel 80 or the soup vessel 91 placed on the first or second vessel place portions 703A, 703B, the remaining soup dropping from the supply nozzle 801A or 802A is directly dropped into the drain pan 702 after removal of the vessel so as not to rebound the soup on the vessel receiving plate 703 to prevent stains of the surface of the vessel receiving plate 703 resulting from the remaining juice. The vessel receiving plate 703 and the drain pan 702 are separably assembled and unified so that they may be removed from the delivery opening 700 to facilitate cleaning them.

On the front surface of the delivery device 30 are disposed, as shown in FIGS. 1 and 3, a first display device 31 as an informing means which displays an order reception number or the like for informing a customer of the fact that the noodles are ready, an announcing device 32 as an informing means for informing by voice a customer of the fact that the noodles are ready, a card slot 33 through which is inserted an order reception card issued by the reception device 1, outlets 34 and 35 for the noodle vessel 80 and the soup vessel 91 corresponding to the delivery opening 700, a second display device 36 for displaying the ordered noodles disposed within the cooked receiving device 20 and for indicating the later guidance for a customer, and the like.

Reference numeral 37 designates a card read device which reads data of an order reception card inserted through the card slot 33 of the delivery device 30 whereby the ordered noodles written on the order reception card is delivered to the first outlet 34 through the delivery opening 700 and if the ordered noodles are not received in the cooked receing device 20, the order reception card may be returned to a customer.

Figure 19:
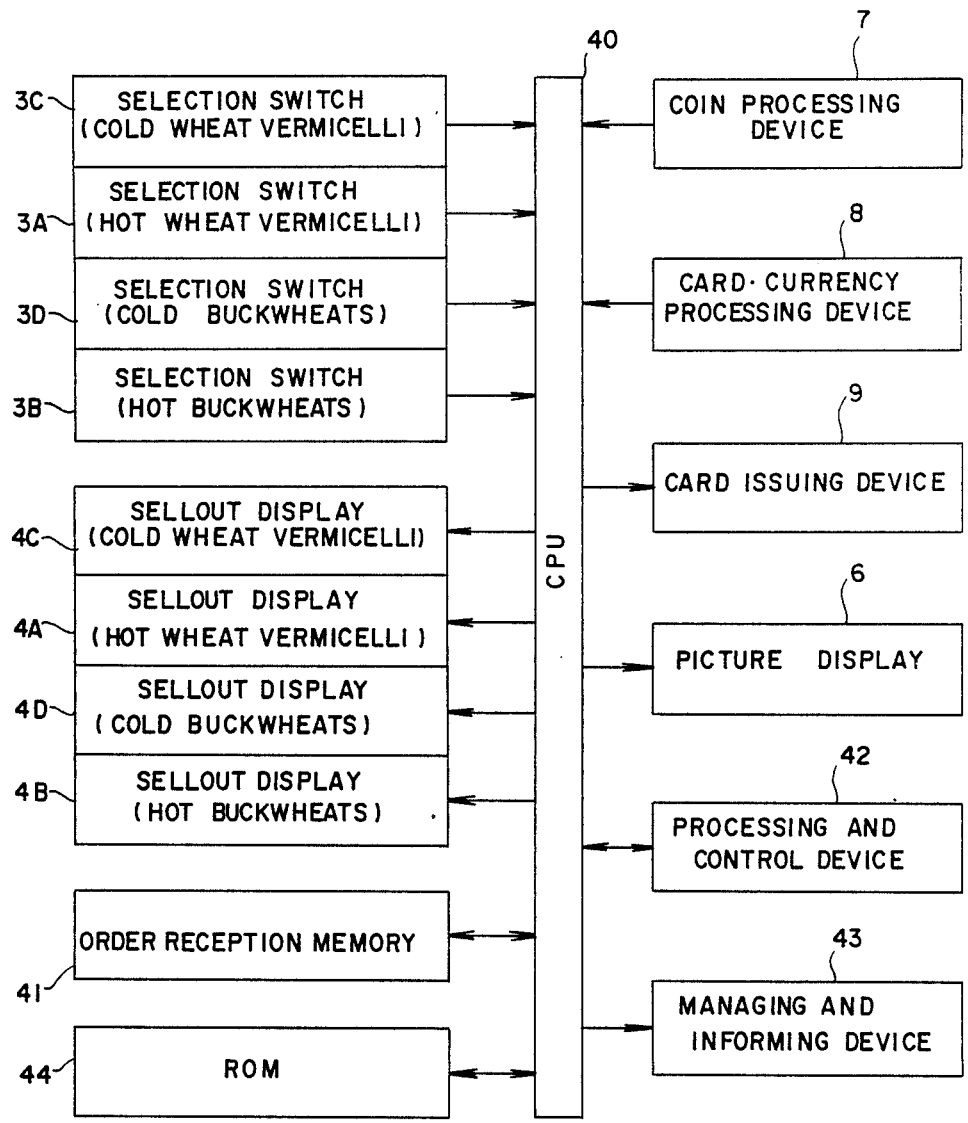
FIG. 19 is a block diagram showing the control structure of a reception device.

FIG. 19 is a block diagram showing the control structure of the reception device 1. Reference numeral 40 denotes a CPU as control means. Selection switches 3A, 3B, 3C and 3D corresponding to plural kinds of selling noodles ("hot wheat verimicelli", "hot buckwheats", "cold wheat vermicelli" and "cold buckwheats"), respectively, sellout displays 4a, 4B, 4C and 4D for displaying the sellout of the selling noodles corresponding to the selection switches 3A, 3B, 3C and 3D, respectively, a picture display 6 for displaying "in preparation", guidance for reception, etc. by CRT, a coin processing device 7, a currency and card processing device 8, a card issuing device 9, an order reception memory 41 for storing noodles ordered, an automatic processing and cooking device 10 for noodles operated and controlled in response to the selecting operation of the selling noodles, a cooked receiving device 20, a processing and control device 42 for controlling a delivery device 30, and a managing and informing device for informing a manager of an abnormality are connected to the CPU 40 and controlled and operated in response to programs stored in ROM 44.

Figure 20:
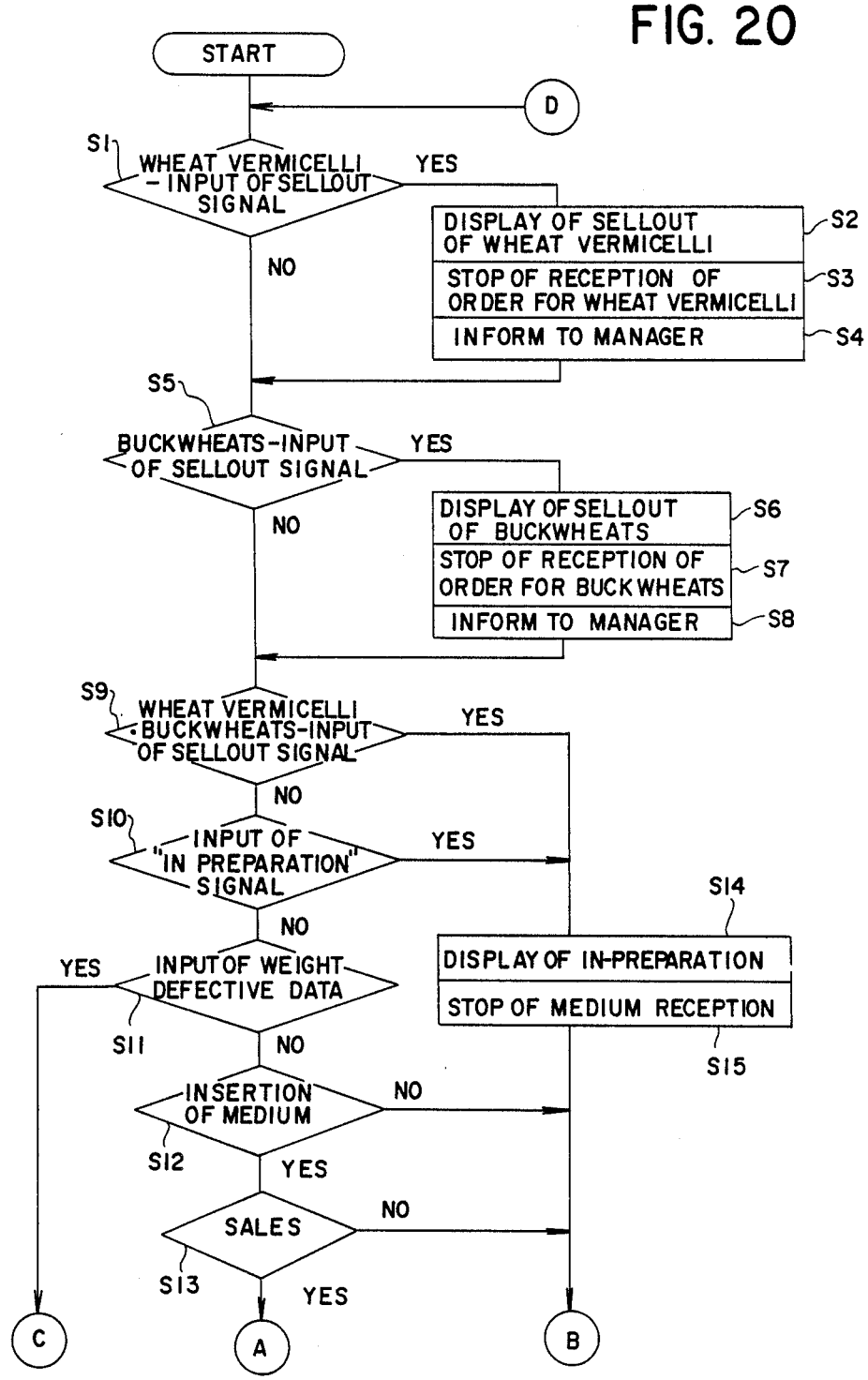
FIGS. 20 and 21 are flow charts showing the control operation of the reception device.
Figure 21:
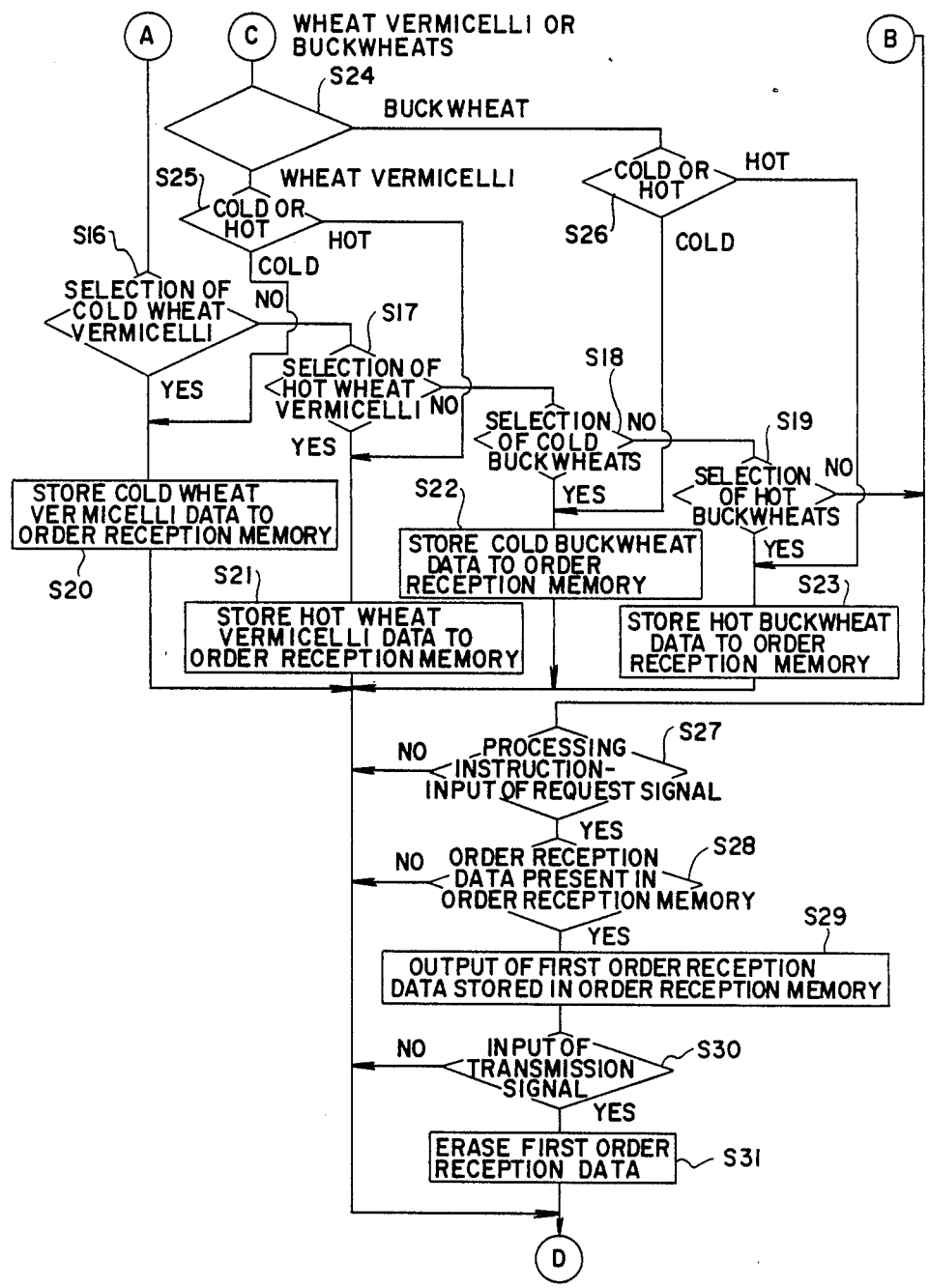

FIGS. 20 and 21 are respectively flow charts showing the control and operation by the CPU 40.

That is, when a sellout signal of "wheat vermicelli" is inputted from the processing and control device 42 (Step S1), the sellout displays 4A, 4C are turned ON (Step S2) and an order reception of "wheat vermicelli" is stopped (Step S3). The managing and informing device 43 is actuated (Step S4) to inform a manager of an abnormality. A process proceeds to Step S5.

In a case where the sellout signal of "wheat vermicelli" is not inputted (Step S1), judgement is made whether a sellout signal of "buckwheats" is inputted from the processing and control device 42 (Step S5). If the sellout signal is inputted, the sellout displays 4B and 4D are turned ON (Step S6) to stop an order reception of "buckwheats" (Step S7). The managing and informing device 43 is actuated (Step S8) to inform a manager of an abnormality. A process proceed to Step S9.

Judgement is made whether or not both the sellout signals of "wheat vermicelli" and "buckwheats" are inputted (Step S9). If both the sellout signals are inputted, the picture display 6 is actuated (Step S14) to display "In preparation". Reception of coins or media such as currency and cards into the coin processing device 7 and the currency and card processing device 8 is stopped (Step S15). A process proceeds to Step S27.

On the other hand, in a case where both the sellout signals of "wheat vermicelli" and "buckwheats" are not inputted (Step S9), a process proceeds to Step S10. Judgement is made whether or not an input of a "In preparation" signal from the processing and control device 42 is present. If the input is present, a process proceeds to Step S14 to actuate the picture display 6 whereby the "In preparation" is displayed similarly to the former, and the operation of Step S15 is carried out. If the input is not present, check is made of an input of weight defective data (Step S11).

When the weight defective data is inputted from the processing and control device 42 (Step S11), a process proceeds to Step S24. If the input is not present, a process proceeds to Step S12 where check is made of the presence or absence of insertion of a coin or a medium such as currency, a card or the like into the coin processing device 7 and the curreny and card processing device 8. If the insertion is present, judgement is made whether or not the value is a proper amount for sales (Step S13). When the amount is a proper value for sales, a process proceeds to Step S16.

In a case where the media is not inserted (Step S12) or in a case where an improper value for sales is judged (Step S13), processes proceed to Step S27.

When judgement is made so that the value is proper for sales (Step S13), judgement is made what selection switch (4A–4D) was selected and operated by a customer (Steps S16 to S19). Data ordered of noodles selected and operated are stored in the order reception memory 41 (Steps S20 to S23). A process returns to Step S1. At that time, when the selecting operation by the customer is not effected in Steps S16 to S19, a process proceeds to Step S27.

On the other hand, when the weight defective data is inputted (Step S11), conformation is made if the defective data is "wheat vermicelli" or "buckwheats" (Step S24). If the defective data is "wheat vermicelli", judgement is made if the data is for "hot wheat vermicelli" or "cold wheat vermicelli" (Step S25). If the defective data is "buckwheats", judgement is made if the data is for "hot buckwheats" or "cold buckwheats" (Step S26)

When the "cold wheat vermecilli" is judged (Step S25), the order reception data of "cold wheat vermicelli" is stored in the order reception memory 41 (Step S20). When the "hot wheat vermecilli" is judged, the order reception data of "hot wheat vermecilli" is stored in the order reception memory 41 (Step S21). Further, when the "cold buckwheats" is judged (Step S26), the order reception data of "cold buckwheats" is stored in the order reception memory 41 (Step S22). When the "hot buckwheats" is judged, the order reception data of "hot buckwheats" is stored in the order reception memory 41 (Step S23).

That is, when the weight defective data is inputted from the processing and control device 42, the noodles ordered according to the data of the weight defective data is stored in the order reception memory 41.

Judgement is made whether or not a processing instruction request signal is inputted from the processing and control device 42 (Step S27). If the signal is inputted, judgement is made whether or not the order reception data is present in the order reception memory 41 (Step S28).

If the order reception data is present, the earliest order reception data among the order reception data stored in the order reception memory 41 is outputted to the processing and control device 42 (Step S29). When a delivery signal is inputted from the processing and control device 42 (Step S30), the order reception data of the order reception memory 41 outputted in Step S29 is erased (Step S31). A process returns to Step S1.

When the processing instruction request signal is not inputted (Step S27), when the order reception data is not present in the order reception memory 41 (Step S28) or when the delivery signal is not inputted from the procssing and control device 42 (Step S30), processes return to Step S1.

That is, in the reception device 1, when the insertion of a fixed coin, currency or a media such as card and the selecting operation for noodles are carried out by the customer, the order reception data of the noodles thus selected are stored in order in the order reception memory 41, and the earliest order reception data stored in the order reception memory 41 is first outputted to the processing and control device 42 in accordance with the request from the processing and control device 42. Where the weight defective data is inputted from the processing and control device 42, the order reception data of the corresponding noodles is stored in the order reception memory 41 irrespective of the selecting operation.

Figure 22:
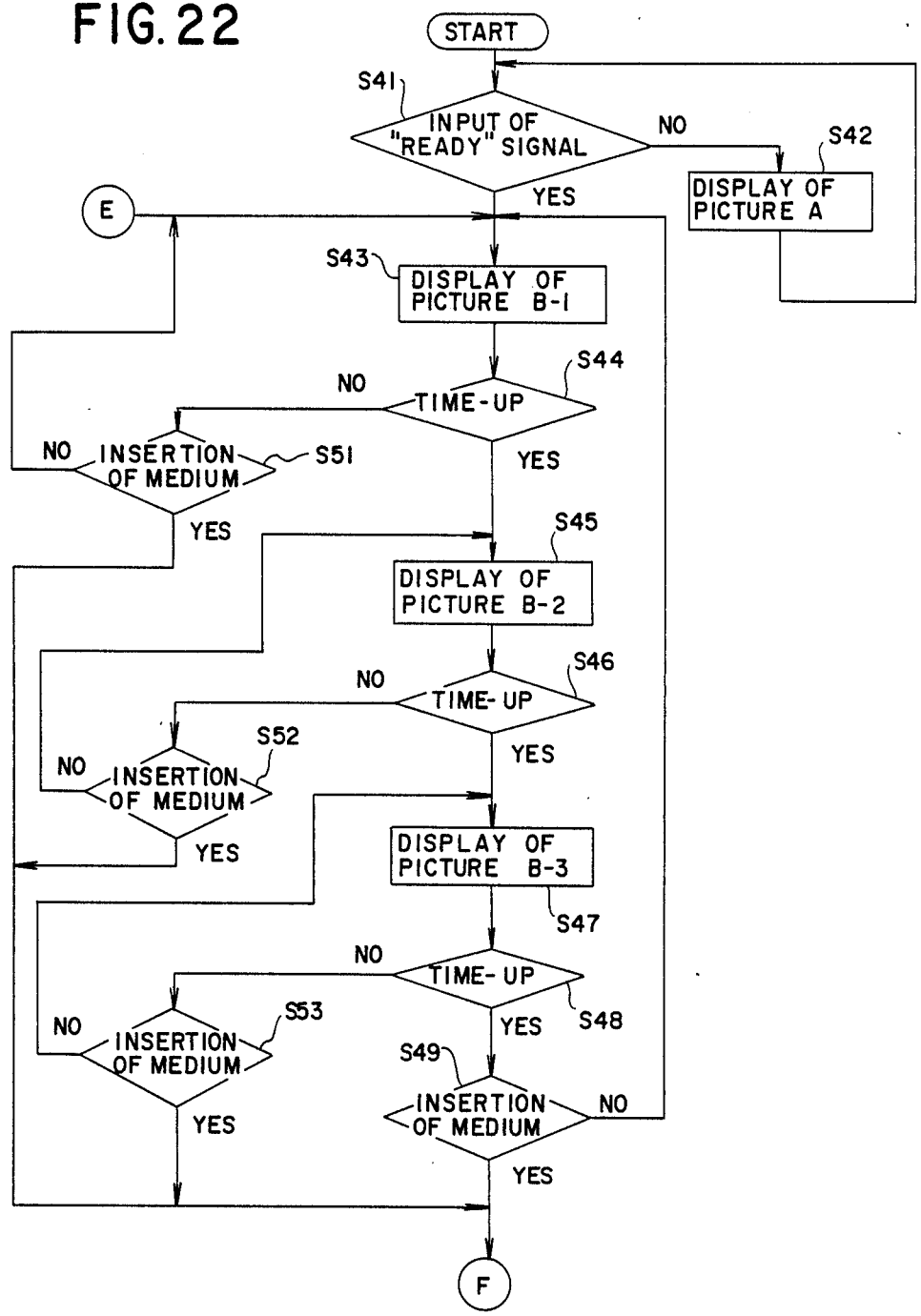
FIGS. 22 and 23 are flow charts showing the control operation of a picture display in the reception device.
Figure 23:
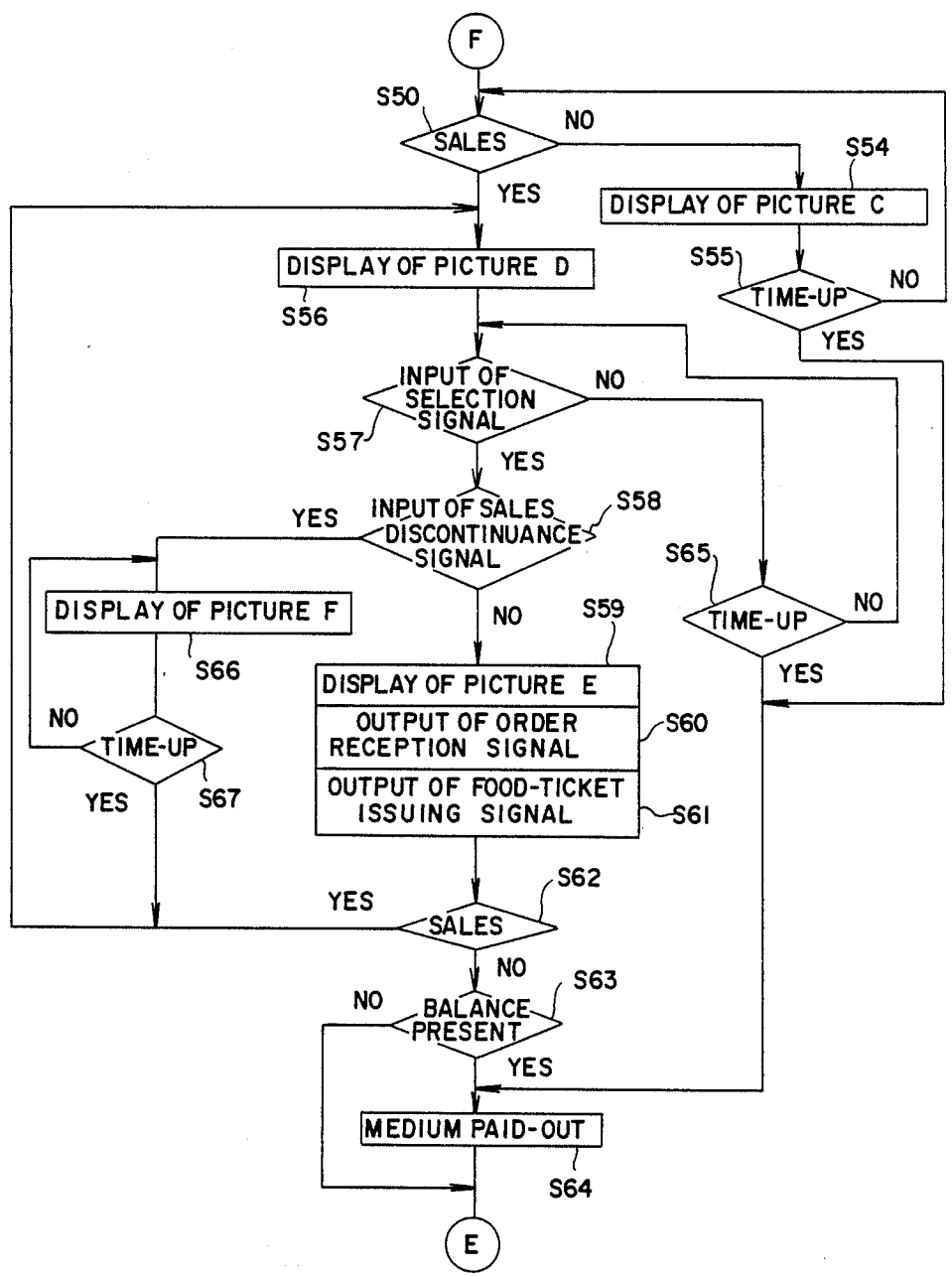

FIGS. 22 and 23 are respectively flow charts showing a picture display control operation of the picture display 6 in the reception device 1.

Figures 24A, 24B, 24C, 24D, 24E, 24F, 24G, 24H:
FIGS. 24 (a), (b), (c), (d), (e), (f), (g) and (h) are explanatory views showing displayed contents on the picture display in the reception device.

That is, an "In preparation" which is "Picture A display" shown in FIG. 24 (a) is displayed (Step S42) till a "ready" signal from the processing and control device 42 is inputted (Step S41).

When the "ready" signal is inputted (Step S41), a sales stand-by state (a customer waiting state) results. "Picture B-1 display", for example, "Fukiage Tei" which is a commercial word of the shop shown in FIG. 24 (b) (Step S43); after passage of fixed time, "Picture B-2 display", for example, "Please try delicious wheat vermicelli and buckwheats" which is a guide of the goods shown in FIG. 24 (c) (Step S44); and after passage of fixed time, "Picture B-3 display", for example, "For ordering wheat vermicelli and buckwheats, please buy a food ticket" which is a reception guide shown in FIG. 24 (d) are switched and displayed. Then, a process proceeds to Step S48.

After the passage of fixed time (Step S48), judgement is made whether or not a card or currency or medium such as coin was inserted (Step S49). Where the medium is inserted, a process proceeds to Step S50. Where the medium is not inserted, a process returns to Step S43. The operation of Steps S43 to S49 are repeatedly carried out.

Judgement is made whether or not the medium was inserted within the time-up time in Step S44 (Step S51). Where the medium was inserted, a process proceeds to Step S50, and where the medium is not inserted, a process returns to Step S43.

Judgement is made whether or not the medium was inserted within the time-up time in Step S46 (Step S52). Where the medium was inserted, a process proceeds to Step S50, and where the medium was not inserted, a process returns to Step S45.

Judgement is made whether or not the medium was inserted within the time-up time in Step S48 (Step S53). Where the medium was inserted, a process proceeds to Step S50, and where the medium was not inserted, a process returns to Step S47.

Where the medium was inserted as described above, judgement is made whether or not the balance of the card or the currency or coin are proper values for sales (Step S50). If the amount is less than the sales value, "Picture C. display", for example, "Welcome !" shown in FIG. 24 (e) is displayed to inform a customer of the fact that the inserted medium is less than the sales value (Step S54). At that time, if a medium for a deficit is additionally inserted within the time-up time (Step S55), a process returns to Step S50 where judgement is further made if the amount is a proper value for sales. This Step S55 controls the display time of "Picture C display" by the Step S54.

If the medium inserted in Step S50 is in excess of the sales value, "Picture D display", for example, "Welcome, please push a proper button." as shown in FIG. 24 (f) is displayed to urge a customer for operation of the selection switch.

And, judgement is made of the operation of the selection switch by the customer (Step S57). When a selection signal for the goods is inputted, a process proceeds to Step S58.

In Step S58, judgement is made whether or not the goods selected by the customer can be sold, that is, whether or not a sales discontinuance signal is inputted from the processing and control device 42. If the signal is not inputted, "Picture E display", for example, "Thank you. Please keep a food ticket and wait for a moment. Please receive the goods at a counter." as shown in FIG. 24 (g) is displayed (Step S59). An order reception signal to the processing and control device 42 is outputted (Step S60), and a food ticket issuing signal to the card issuing device 9 is outputted (Step S61). Thereafter, a process proceeds to Step S62.

In Step S62, judgement is made whether or not an additional sales of the goods for the customer is present If the additional sales is not present, judgement is made of the presence or absence of the balance of coins or currency inserted in Step S50 (Step 63). Where the balance is present, the medium in the value corresponding to the balance is paid out (Step S64). A process again returns to Step S43 where a picture display in the stand-by similar to the former is made. Where the balance is not present in Step S63, a process directly returns to Step S43.

Where an additional sales is present in Step S62, a process returns to Step S56 where a picture display similar to the former is effected.

On the other hand, in a case where the display time of "Picture C display" by Step S54 is controlled (Step S55) so that the sales value is less in the time-up time, a process proceeds to Step S64 where the inserted medium is paid out, after which a process proceeds to Step S43.

In a case where the operating time of the selection signal in Step S65 is controlled (Step S57) so that a selection signal is not inputted in the time-up time, a process proceeds to Step S64 where the inserted medium is paid out, after which a process returns to Step S43.

The time-up time by Steps S44, S46, S48, S55 and S65 is set to approximately 10 seconds.

In a case where when the selection switch is operated after the medium in excess of the sales value has been inserted, the thus operated goods have already been ordered in the fixed number (for example, 10 meals for the respective "wheat vermecilli" and "buckwheats") and are being processed and cooked, that is, in a case where a sales discontinuance signal is inputted from the processing and control device 42 in Step S58, "Picture F display", for example, "Rush. Please wait for a while." as shown in FIG. 24 (h) is displayed (Step S66). The time-up time by Step S67 is set to approximately 3 seconds. When "Picture F display" is timed-up in Step S67, a process again returns to Step S56 where the previous state of the selecting operation is continued.

FIG. 25 is a block diagram showing a supply and control mechanism of the vessel 80 to the set position (dish-out position) by the vessel distribution device 17. In FIG. 25, reference numeral 45 designates a CPU as a vessel delivery and control means.

Stockers 504A to 504F as six units of first to six vessel supply devices arranged in order from the farthest one from the set position C on 10 distribution tables 501 . . . which are intermittently moved around by a track-like vessel carrier mechanism 500, first vessel detection sensors 505A to 505F for detecting the presence or absence of the vessels 80 stocked in the respective stockers, second vessel detection sensors 506B to 506F for detecting the presence or absence of the vessels 80 delivered from the stockers 504A to 504F and placed on the distribution tables 501 . . . , and a memory 46 in which flags are written in memory areas R1 to R6 are connected to the CPU 45, the CPUT 45 being controlled and operated by the input of an intermittent signal and the input of a vessel delivery signal, and a sales stop signal may be outputted as needed.

Figure 26:
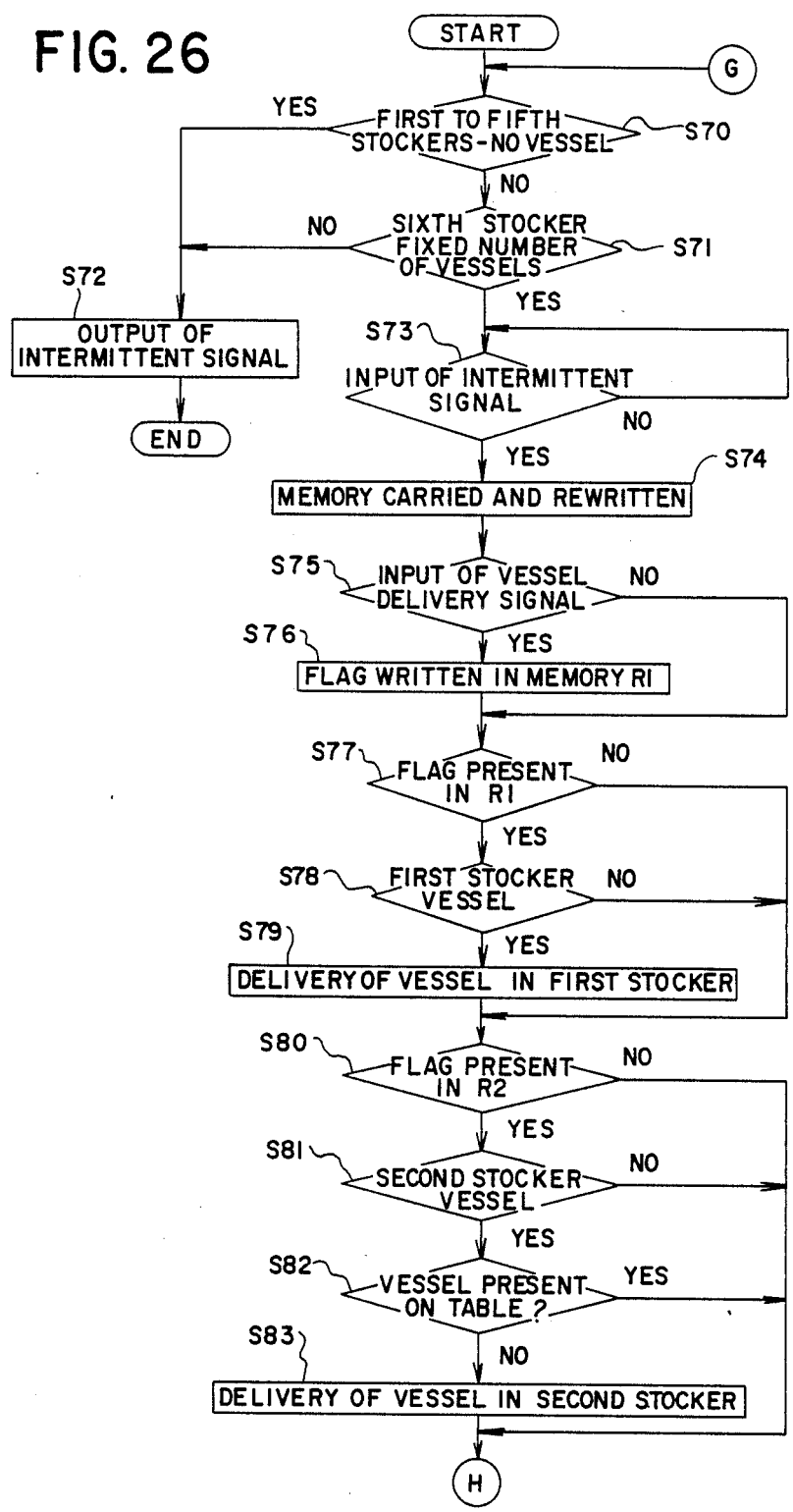
FIGS. 26 to 29 are flow charts showing the control operation of the vessel distributing device.
Figure 27:
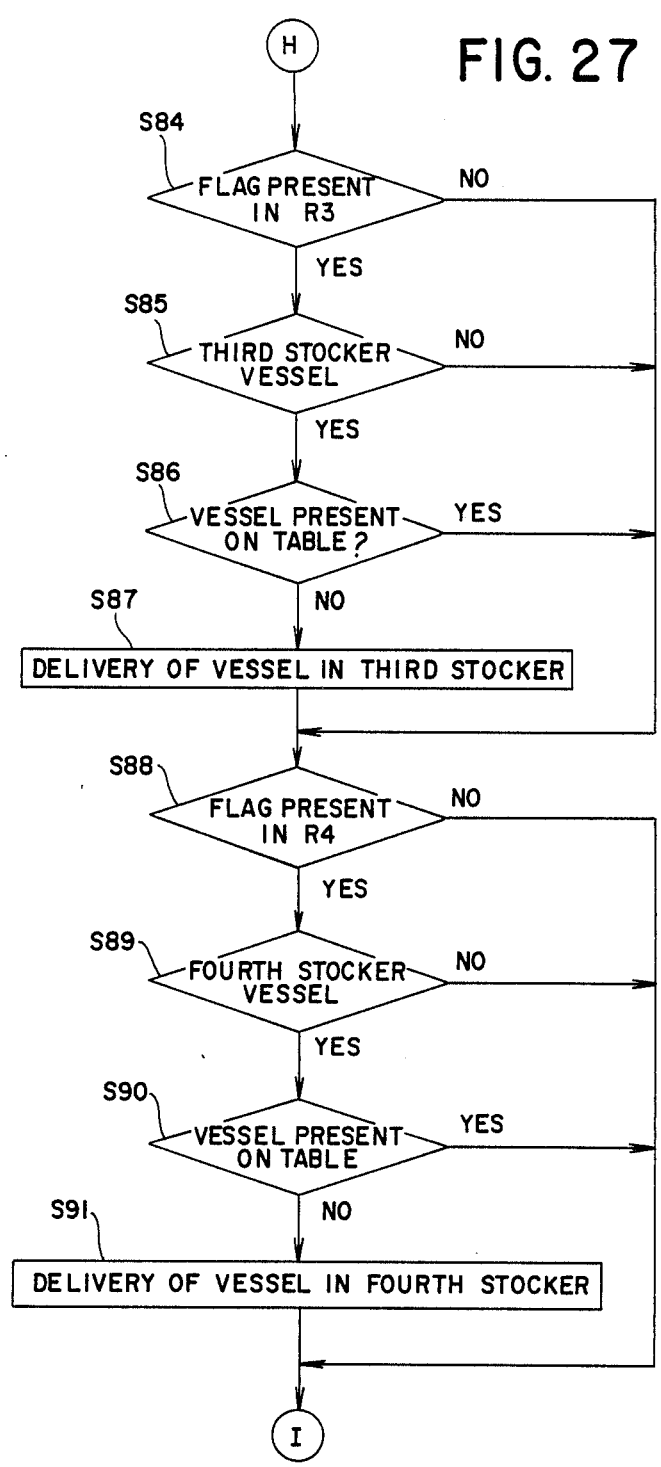
Figure 28:
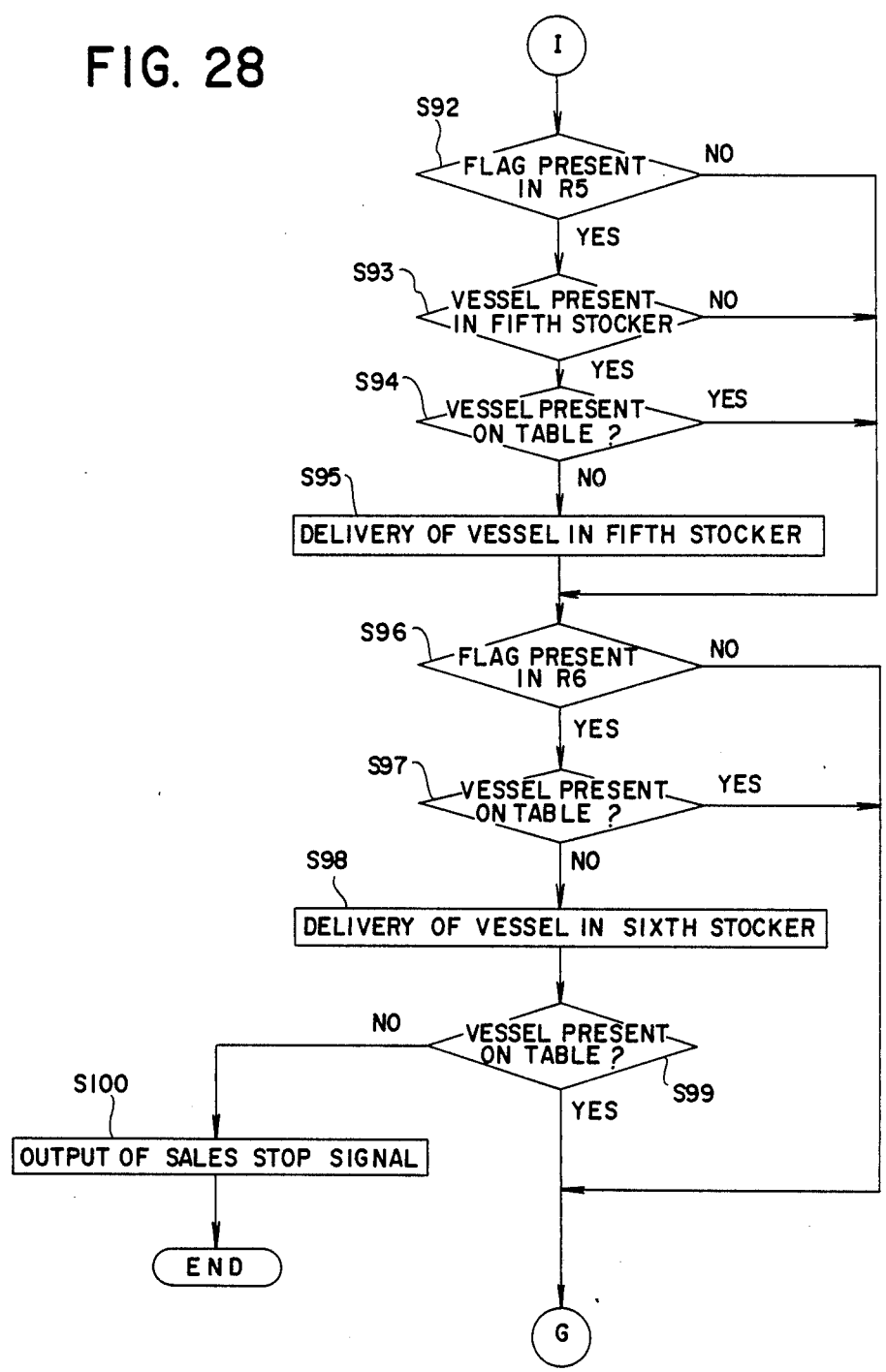

FIGS. 26 to 28 are flow charts showing the supply and control operation of the vessels 80 to the set position C by the vessel distribution device 17.

That is, judgement is made of the presence or absence of the vessel 80 within the first to fifth stockers 504A to 504E (Step S70), and judgement is made of the presence or absence of the vessel 80 within the six stocker 504F (Step S71). If the vessel 80 is not stocked in the first to sixth stockers 504A to 504F, a sales stop signal is outputted for termination (Step S72).

If the vessel 80 is stocked in the first to sixth stockers 504A to 504F (Steps S70 and S71), judgement is made whether or not an intermittent signal is inputted (Step S73). If the intermittent signal is inputted, the memory is carried and rewritten (Step S74). A process proceeds to Step S75.

In Step S75, judgement is made if a vessel delivery signal is inputted. If the signal is inputted, a flag is written and stored in an memory area R1 of the memory 46 (Step S76). Judgement is made of the presence or absence of the flag stored in the memory area R1 (Step S77). If the vessel delivery signal is not inputted (Step S75), a process proceeds to Step S77 where judgement is made if the flag is present in the memory area R1.

If judgement is made so that the flag is present in the memory area R1 (Step S77), judgement is made of the presence or absence of the vessel within the first stocker 504A. When the vessel is stocked, the first stocker 504A is actuated (Step S79) whereby the vessel is delivered to and placed on the distribution table 501 correspondingly positioned below the first stocker 504A. A process proceeds to Step S80. When the flag is not present in the memory area R1 (Step S77), and when the vessel is not present in the first stocker 504A (Step S78), a process proceeds to Step S80.

In Step S80, judgement is made whether or not a flag is present in a memory area R2. If the flag is present in the memory area R2, judgement is made of the presence or absence of the vessel in the second stocker 504B. If the vessel is present in the second stocker 504B, judgement is made whether or not the vessel delivered to and placed on the distribution table 501 correspondingly positioned below the second stocker 504B from the first stocker 504A is present (Step S82). If the vessel is not present, the second stocker 504B is actuated (Step S83) where the vessel is delivered to and placed on the distribution table 501 correspondingly positioned below the second stocker 504B.

On the other hand, in a case where judgement is made so that the flag is not present in the memory area R2 of the memory 46 (Step S80), judgement is made so that the vessel is not present in the second stocker 504B (Step S81) and judgement is made so that the vessel delivered to and placed on the distribution table 501 correspondingly positioned below the second stocker 504B from the first stocker 504A is present (Step S82), a process proceeds to Step S84.

In Step S84, judgement is made if a flag is present in a memory area R3 of the memory 46. If the flag is present in the memory area R3, judgement is made of the presence or absence of the vessel in the third stocker 504C (Step S85). If the vessel is present in the third stocker 504C, judgement is made whether or not the vessel delivered to and placed on the distribution table 501 correspondingly positioned below the third stocker 504C from the second stocker 504B is present. If the vessel is not present, the third stocker 504C is actuated (Step S87) whereby the vessel is delivered to and placed on the distribution table 501 correspondingly positioned below the third stocker 504C. A process proceeds to Step S88.

On the other hand, in a case where judgement is made so that the flag is not present in the memory area R3 of the memory 46 (Step S84), judgement is made so that the vessel is not present in the third stocker 504C (Step S85) and judgement is made so that the vessel delivered to and placed on the distribution table 501 correspondingly positioned below the third stocker 504C from the second stocker 504B is present (Step S86), a process proceeds to Step S88.

In Step S88, judgement is made if a flag is present in an memory area R4 of the memory 46. If the flag is present in the memory area R4, judgement is made of the presence or absence of the vessel in the fourth stocker 504D (Step S89). If the vessel is present in the fourth stocker 504D, judgement is made of the presence or absence of the vessel delivered to and placed on the distribution table 501 correspondingly positioned below the fourth stocker 504D from the third stocker 504C (Step S90). If the vessel is not present, the fourth stocker 504D is actuated (Step S91) whereby the vessel is delivered to and placed on the distribution table 501 correspondingly positioned below the fourth stocker 504D. A process proceeds to Step 92.

In a case where judgement is made so that the flag is not present in the memory area R4 of the memory 46 (Step S88), judgement is made so that the vessel is not present in the fourth stocker 504D (Step S89), and judgement is made so that the vessel delivered to and placed on the distribution table 501 correspondigly positioned below the fourth stocker 504C from the third stocker 504C is present (Step S90), a process proceeds to Step S92.

In Step S92, judgement is made if a flag is present in a memory area R5 of the memory 46. If the flag is present in the memory area R5, judgement is made of the presence or absence of the vessel in the fifth stocker 504E. If the vessel is present in the fifth stocker 504E, judgement is made whether or not the vessel delivered to and placed on the distribution table 501 correspondingly positioned below the fifth stocker 504E from the fourth stocker 504D is present (Step S94). If the vessel is not present, the fifth stocker 504E is actuated (Step S95) and the vessel is delivered to and placed on the distribution table 501 correspondingly positioned below the fifth stocker 504E. A process proceeds to Step S96.

On the other hand, in a case where judgement is made so that the flag is not present in the memory area R5 of the memory 46 (Step S92), judgement is made so that the vessel is not present in the fifth stocker 504E (Step S93) and judgement is made so that the vessel delivered to and palced on the distribution table 501 correspondingly positioned below the fifth stocker 504E from the fourth stocker 504D is present (Step S94), a process proceeds to Step S96.

In Step S96, judgement is made of the presence or absence of a flag in a memory area R6 of the memory 46. If the flag is present in the memory area R6, judgement is made of the presence or absence of the vessel in the sixth stocker 504F (Step S97). If the vessel is present in the sixth stocker 504F, judgement is made whether or not the vessel delivered to and placed on the distribution table 501 correspondingly positioned below the sixth stocker 504F from the fifth stocker 504E is present (Step S98). If the vessel is not present, the sixth stocker 504F is actuated (Step S99) whereby the vessel is delivered to and placed on the distribution table 501 correspondingly positioned below the sixth stocker 504F. Judgement is again made of the presence or absence of the vessel on the distribution table 501 correspondingly positioned below the sixth stocker 504F (Step S99). If the vessel is present, a process proceeds to Step S70.

On the other hand, in a case where judgement is made so that the flag is not present in the memory area R6 of the memory 46 (Step S96) and judgement is made so that the vessel delivered to and placed on the distribution table 501 correspondingly positioned below the sixth stocker 504F from the fifth stocker 504E is present, a process returned to Step S70. At that time, in a case where judgement is made so that the vessel is not present (Step S99), a sales stop signal is outputted for termination (Step S100).

Figure 29:
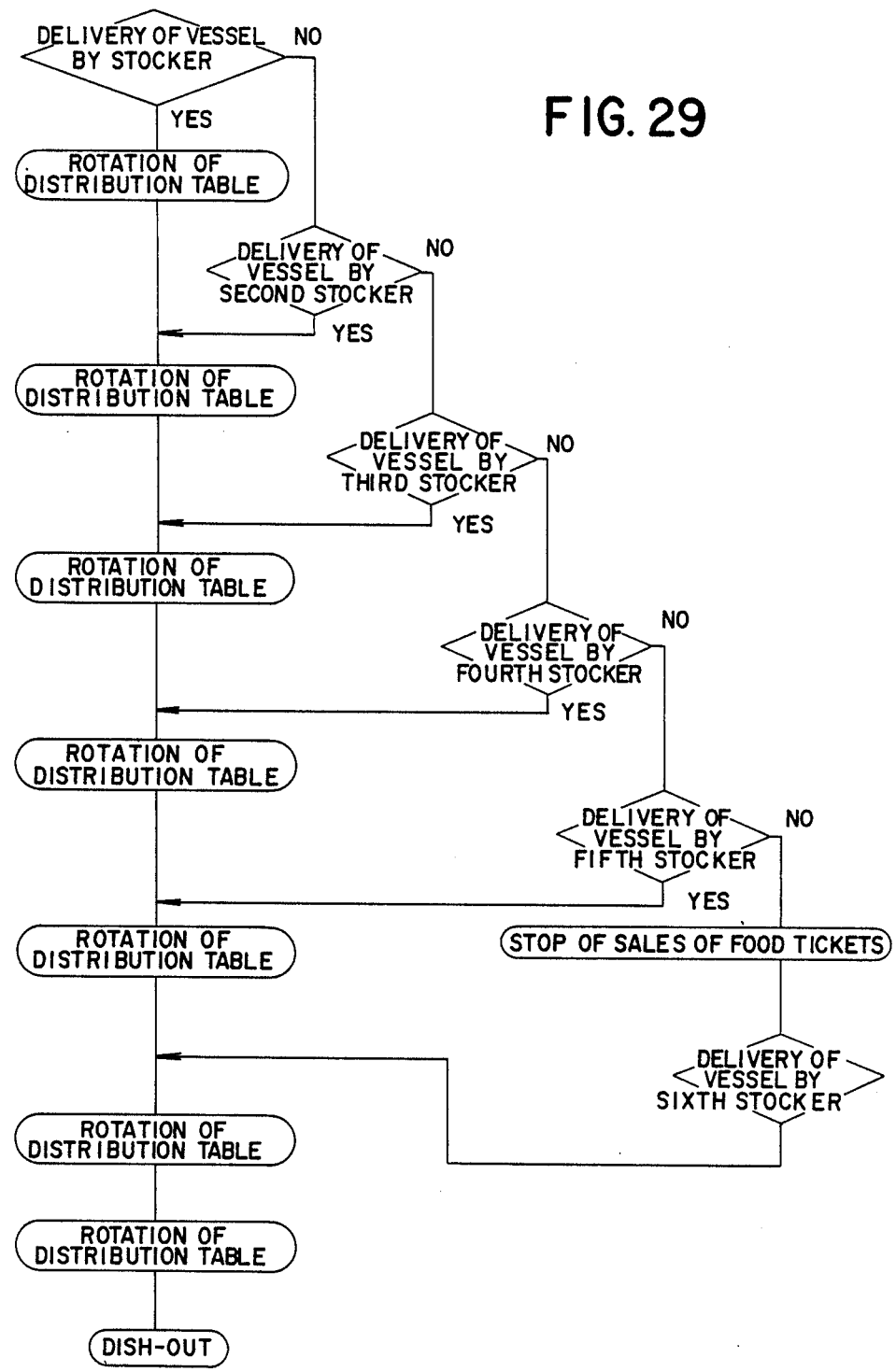

That is, in the vessel distribution device 17, as shown in the flow chart of FIG. 29, when the vessel is delivered from the first stocker 504A to the distribution table 501, the corresponding distribution table 501 is intermittently moved seven times in response to an intermittent signal whereby it may reach the set position C which is a dish-out position. When a delivery of a vessel from the first stocker 504 is not assured, for example, two times of delivery action are carried out and yet the vessel is not delivered, it is so judged that the stocker is empty or in trouble. The next, second stocker 504B is then driven to deliver and place the vessel on the corresponding distribution table 501, and the distribution table is intermittently moved six times in response to an intermittent signal to reach the set position C as a dish-out position. These supplying operations are similarly carried out in order also with respect to the third to fifth stockers 504C to 504E.

The six stocker 504F is used as a stand-by stocker. In the event that the vessel 80 is not delivered from the fifth stocker 504E, an issuance of food tickets by the reception device 1 is stopped, and the sellout displays 4A, 4B, 4C and 4D are turned ON to inform a customer of the fact that the goods are sold out.

That is, the sixth stocker 504F is controlled and operated so that for example, as in the case where the processing and cooking device 10 which has already received an order is being operated, vessels are preliminarily delivered in response to the situation such that vessels are not supplied from the first to fifth stockers 504A to 504E, during the processing and cooking.

Accordingly, the first vessel detection sensor 505F for detecting the presence or absence of the vessel in the sixth stocker 504F as previously mentioned is so set as to detect the "presence" of vessel in a case where vessels in number more than that capable of receiving all noodles during the processing and cooking.

As will be apparent from the above explanation, in the present invention, when a coin or a medium such as a card is inserted into a reception means by a customer to select the noodles to be sold, an order reception card is issued, and an automatic processing and cooking device comprising noodle manufacturing means, noodle boiling means and boiled noodle rinsing means is actuated whereby the desired boiled noodles are processed and cooked, the cooked boiled noodles are dished out in a vessel supplied from the vessel distribution means and received into the cooked boiled noodle receiving means, and a vessel with the cooked boiled noodle put therein is delivered from a delivery means in response to a customer's reception request resulting from casting of an order reception card. The operation from a reception of an order of noodles to noodle manufacturing, boiling processing, rinsing and delivery can be collectively fully automatically carried out.

Furthermore, the vessel distribution means is provided to place vessels delivered one by one from plural (N) units of vessel supply devices on plural units of distribution tables which are moved by the carrier mechanism and supply to the set position, cause the vessel supply devices to delivery vessels preferentially up to the (N—1) unit in order from the farthest position from the set position and use as a stand-by the N-th vessel supply device located nearest to the set position. An excellent effect is provided wherein for example, even if the vessel supply devices up to the (N—1)th unit are empty or in trouble, the vessel can be positively supplied by the N-th vessel supply device.

What is claimed is:

1. An automatic processing, cooking and selling apparatus for noodles comprising a reception means for receiving a coin or a fixed medium such as a card from a customer to issue an order reception card; a noodle manufacturing means for forming a noodle substrate into noodle lines in response to the operation of said reception means to deliver it as a unit of one meal; a noodle boiling means for receiving the noodle lines as one meal delivered from said noodle manufacturing means into a first water permeable basket which is moved within a boiling hot water tank to boil it up; a boiled noodle rinsing means for receiving the noodle boiled up by said noodle boiling means into a second water permeable basket which is moved within a processing tank to rinse it; a boiled noodle casting means for casting, dishing-out and receiving the cooked boiled noodles within said second water permeable basket subjected to rinsing by said boiled noodle rinsing means into a vessel; a vessel distribution means for distributing the vessel to a dish-out set position of said boiled noodle casting means; a cooked boiled noodle reception means for receiving the cooked boiled noodle vessel distributed by said vessel distribution means and dished out by said boiled noodle casting means; and a delivery means for delivering the cooked boiled noodle vessel received in said cooked boiled noodle reception means in response to a customer's reception request resulting from an insertion of said order reception card.

2. The apparatus according to claim 1, wherein the noodle boiling means comprises a hot water supply device for supplying boiling hot water into the boiling hot water tank; a boiling hot water jetting means for jetting the boiling hot water supplied from said hot water supply device against the noodle lines received in the water permeable basket which is moved within the boiling hot water tank; and a boiling hot water supply and drain control means for the supply and drain control so as to maintain a fixed level according to a reduced amount and an increased amount of the boiling hot water within the boiling hot water tank.

3. The apparatus according to claim 1, wherein the water permeable basket is composed of a water permeable tubular side wall, a bottom plate of which bottom portion can be opened and closed, and a spring for urging said bottom plate in a closing direction.

4. The apparatus according to claim 1, comprising a vibration applying device for forcibly applying vibration to the second water permeable basket with the rinsed, cooked and boiled noodles received therein.

5. The apparatus according to claim 1, wherein the vessel distribution means comprises a plurality of distribution tables which are intermittently moved around by a vessel carrier mechanism; a plurality of vessel supply devices arranged on said distribution tables to deliver and place vessels arranged on and received in said distribution tables one by one; a vessel detection sensor for detecting the presence or absence of a vessel delivered and placed on the distribution table; and a vessel delivery and control means for delivering vessels preferentially in order from the vessel supply device at a position farthest from the dish-out set position and delivering a vessel from a next vessel supply device in the event that a detection of the vessel by the vessel detection sensor is not assured.

6. The apparatus according to claim 1, wherein the cooked boiled noodle receiving means comprises a disposal means for the disposal of the cooked boiled noodle vessel which has passed a fixed period of time.

7. An automatic processing, cooking and selling apparatus for noodles comprising a reception means into which a coin or a fixed medium such as a card is inserted by a customer and which issues an order reception card by operation of selecting cold noodles or hot noodles; a noodle manufacturing means operated in response to the selecting operation by said reception means to form a noodle substrate into noodle lines and deliver it as one-meal unit; a noodle boiling means for receiving the noodle lines as one meal delivered from said noodle manufacturing means into a water permeable basket which is moved within a boiling hot water tank to boil it up; a boiled noodle rinsing means for receiving the noodles boiled up by the noodle boiling means into a water permeable basket which is moved within a processing tank to subject the boiled noodles to rinsing with cooling water by a cooling-water rinsing device and subjecting hot noodles selected by said selecting operation to hot water processing by a hot-water rinsing device when said hot noodles are correspondingly positioned; a boiled noodle casting means for casting, dishing-out and receiving the cooked boiled noodles within the water permeable basket subjected to rinsing processing by said boiled noodle rinsing means into a vessel; a vessel distribution means for distributing the vessel to a dish-out set position of said boiled noodle casting means; a cooked boiled noodle receiving means for receiving a cooked boiled noodle vessel distributed by said vessel distribution means and dished out by said boiled noodle casting means; and a delivery means for delivering the cooked boiled noodle vessel received in said cooked boiled noodle receiving means in response to a customer's reception request resulting from the insertion of said order reception card.

* * * * *